United States Patent
Murase et al.

(10) Patent No.: US 9,174,303 B2
(45) Date of Patent: Nov. 3, 2015

(54) METHOD OF BONDING ALUMINUM ALLOY MATERIALS TO EACH OTHER

(75) Inventors: Takashi Murase, Tokyo (JP); Kazuko Fujita, Tokyo (JP); Akio Niikura, Tokyo (JP)

(73) Assignee: Furukawa-sky Aluminum Corp., Tokyo (JP)

( * ) Notice: Subject to any disclaimer, the term of this patent is extended or adjusted under 35 U.S.C. 154(b) by 0 days.

(21) Appl. No.: 13/701,881

(22) PCT Filed: Jun. 6, 2011

(86) PCT No.: PCT/JP2011/062899
§ 371 (c)(1),
(2), (4) Date: Feb. 12, 2013

(87) PCT Pub. No.: WO2011/152556
PCT Pub. Date: Dec. 8, 2011

(65) Prior Publication Data
US 2013/0206822 A1 Aug. 15, 2013

(30) Foreign Application Priority Data
Jun. 4, 2010 (JP) .................................. 2010-129289

(51) Int. Cl.
*B23K 20/233* (2006.01)
*B23K 20/16* (2006.01)

(52) U.S. Cl.
CPC .............. *B23K 20/16* (2013.01); *B23K 20/2336* (2013.01); *B23K 2203/10* (2013.01)

(58) Field of Classification Search
USPC ........... 228/221, 262.5, 262.51; 428/650, 654
See application file for complete search history.

(56) References Cited

U.S. PATENT DOCUMENTS 4,689,092 A    8/1987   Suzuki et al.
4,890,784 A    1/1990   Bampton
(Continued)

FOREIGN PATENT DOCUMENTS

CN    1266766 A    9/2000
EP    1 466 691 A1    10/2004
(Continued)

OTHER PUBLICATIONS

"Welding/Bonding Technique Data Book, p57", Welding/Bonding Technique Data Book Edition Committee, (2007)—Discussed in the specification.
(Continued)

*Primary Examiner* — Devang R Patel
(74) *Attorney, Agent, or Firm* — Carrier Blackman & Associates, P.C.; Joseph P. Carrier; William D. Blackman

(57) ABSTRACT

A method of bonding two members including an aluminum alloy material as one member, and an aluminum alloy material or a pure aluminum material as the other member, the method being characterized in: that the aluminum alloy material for the one member and the aluminum alloy material for the other member are composed of an aluminum alloy containing Mg of not more than 0.5 mass %; and that a bonding process is carried out in a furnace having a non-oxidizing atmosphere at a temperature, at which a ratio of a mass of liquid phases generated in the aluminum alloy material defined as the one member to the total mass of the aluminum alloy material falls within a range from 5% to 35%, on the condition that there is either a coated fluoride-based flux or a coated chloride-based flux between both of the members to be bonded.

51 Claims, 5 Drawing Sheets

(56) References Cited

U.S. PATENT DOCUMENTS

| | | | |
|---|---|---|---|
| 5,564,619 A * | 10/1996 | Childree | 228/252 |
| 8,216,693 B2 * | 7/2012 | Matsukado et al. | 428/654 |
| 2004/0238604 A1 | 12/2004 | Hasegawa et al. | |

FOREIGN PATENT DOCUMENTS

| | | | |
|---|---|---|---|
| JP | 54067541 A * | 5/1979 | |
| JP | S59-229294 A | 12/1984 | |
| JP | S61-007081 A | 1/1986 | |
| JP | 63-108970 A | 5/1988 | |
| JP | 10-313214 A | 11/1998 | |
| JP | H10-313214 A | 11/1998 | |
| JP | 3243288 B2 | 1/2002 | |
| JP | 2002-361487 A | 12/2002 | |
| JP | 2003-048077 A | 2/2003 | |
| JP | 2003-088948 A | 3/2003 | |
| JP | 2005-030513 A | 2/2005 | |
| JP | 2006-239745 A | 9/2006 | |
| JP | 4261705 B2 | 4/2009 | |
| JP | 2009-226454 A | 10/2009 | |
| JP | 2009-291793 A | 12/2009 | |
| JP | 2010-094683 A | 4/2010 | |

OTHER PUBLICATIONS

Office Action dated May 2, 2013 issued in the corresponding CN Patent Application 201180026443.2.

EP Supplementary Search Report, date of completion Oct. 24, 2013, issued in the corresponding EP Patent Application 11 78 9955.

* cited by examiner (a) (b) (c) (d)

FIG.7
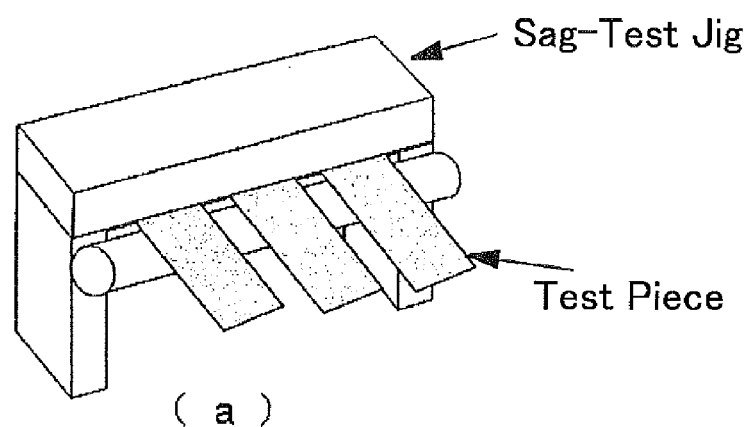
(a)
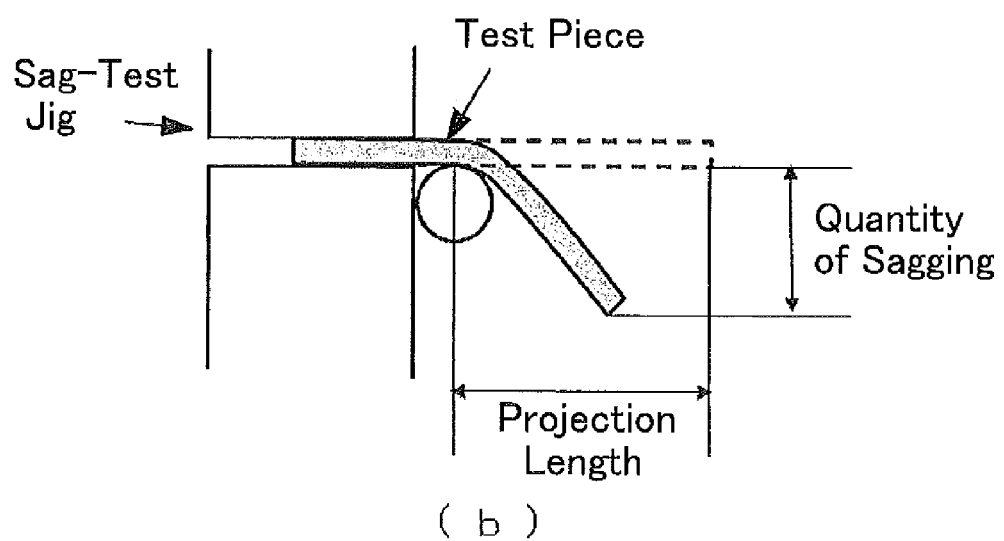
(b)

METHOD OF BONDING ALUMINUM ALLOY MATERIALS TO EACH OTHER

FIELD OF THE INVENTION

The present invention relates to a method of bonding two members to each other wherein an aluminum alloy material is defined as one of the members, and wherein either an aluminum alloy material or a pure aluminum material is defined as the other member.

BACKGROUND OF ART

Conventionally, a variety of methods has been used to bond metal members to each other. According to Non-Patent Document 1, the metal bonding method is generally sorted into a metallic bonding method, a chemical bonding method and a physical bonding method. Any one of these bonding methods has been used to bond aluminum alloy materials to each other.

The metallic bonding method is to strongly bond metal members to each other. By suitably carrying out the metallic bonding method, it is possible to enhance high reliability in the bond junction of the metal members. Concretely, the metallic bonding method is further sorted into a metal-fusing/welding type bonding method; a solid-phase type bonding method such as a diffusion bonding method, a friction bonding method, a pressure bonding method and so forth; and a liquid-phase/solid-phase reaction type bonding method such as a brazing method and so forth. Especially, in the brazing method, which is defined as the liquid-phase/solid-phase reaction type bonding method, since a bonding process is carried out by heating a whole of metal members to be bonded in an furnace, it is possible to simultaneously bond the metal members at plural locations. The brazing method featuring this technical advantage is mostly applied to manufacture of a product, having many bonding locations in a narrow space, such as a heat exchanger for an automobile, a heat sink and so forth.

The chemical bonding method is defined as one using an adhesive. This chemical bonding method is different from the metallic bonding method in that it is unnecessary to carry out a bonding process at a high temperature, and thus features a technical advantage that metal members to be bonded are subjected to thermal deformation. Nevertheless, in the chemical bonding method, since it is impossible to obtain a strong bonding force like the metallic bonds, there are disadvantages that reliability and thermal conductivity in the bond junction of the metal members are inferior to the metallic bonding method.

The physical bonding method is defined as one using rivets, bolts and so forth. In this physical bonding method, a bonding process can be easily carried out with comparison with the metallic bonding method and the chemical bonding method. Also, it is possible to obtain a bonding strength which is equivalent to or more than that of the metallic bonding method. Nevertheless, there are disadvantages that a configuration in the bond junction of metal members to be bonded is limited, and that the physical bonding method is unsuitable when tightness is needed in the bond junction of the metal members.

Conventionally, in order to bond aluminum alloy materials to each other, a metallic bonding method such as a welding method, a soldering method, a brazing method and so forth has been used.

In the welding method, portions of aluminum alloy members to be bonded are heated and melted by using electricity or flame, to thereby alloy the portions with each other, resulting in the portions of the aluminum alloy members being bonded to each other. When a clearance between the portions of the aluminum alloy members is large or when a sufficient bonding strength is needed, a filler material is simultaneously melted during the bonding process so that the clearance is filled with the melted filler material. In this welding method, since the portions of the aluminum alloy members to be bonded are melted, it is possible to securely bond the portions of the aluminum alloy members to each other. Nevertheless, due to the fact that the portions of the aluminum alloy members are melted and bonded to each other, the aluminum alloy members may be largely deformed in the vicinity of the portions thereof to be bonded, and the melted portions may locally and largely change from the original metal structure into another metal structure, so that the bonded portions may be locally weakened. Also, due to the fact that only the portions of the aluminum alloy members to be bonded must be heated during the bonding process, there is a problem that it is very difficult to simultaneously bond the aluminum alloy members at plural locations.

In the soldering method or the brazing method, a soldering material or a brazing material is used, and has a melting point lower than those of aluminum alloy members to be bonded. Thus, only the soldering material or the brazing material is heated and melted by using electricity or flame, so that the melted soldering or brazing material is filled with a clearance between portions of aluminum alloy members to be bonded, resulting in the portions of the aluminum alloy members being bonded to each other. When the portions of the aluminum alloy members have a spot-like configuration or a linear-like configuration, it is possible to advantageously bond them to each other, and, by defining a so-called fillet during solidification of the melted soldering or brazing material, it is possible to obtain high reliability on strength, thermal conductivity and so forth in the bond junction of the aluminum alloy members. Also, the portions of the aluminum alloy members can be firmly bonded to each other in a short time without melting the base materials thereof. Especially, a furnace-type brazing method such as a NOCOLOK brazing method, a vacuum brazing method and so forth features a brazing sheet which is composed of an aluminum alloy material defining a member to be bonded, and a brazing material cladded on the member to be bonded. After brazing sheets are pressed and are formed into a lamination type heat exchanger assembly having a hollow structure, by merely heating it in a furnace, it is possible to manufacture a heat exchanger featuring many bonding locations and complex configurations. Nevertheless, in the furnace-type brazing method, the melted liquid-phase soldering or brazing material easily flows over so that small passages in the heat exchanger may be filled with the melted soldering or brazing material. Also, when brazing sheets are used, there is an advantage that the melted soldering or brazing material can be uniformly given to portions of aluminum alloy members to be bonded. Nevertheless, due to the fact that the manufacture of a brazing sheet is complex, there are demands that the brazing sheet should be manufactured at small cost, and that supply of the brazing sheet should be improved. Further, there are problems that a degree of freedom on a machine work such as a cutting and so forth, to which faces of aluminum alloy members to be bonded should be subjected, is reduced.

As a general rule, the solid-phase type bonding method such as the diffusion bonding method, the friction bonding method and so forth is defined as one in which melt of metal members to be bonded is not involved.

Basically, the diffusion bonding method is defined as one in which base metal materials are closely pressed against each other at a temperature lower than a melting point of the base metal materials without being subjected to plastic deformation, resulting in the metal materials being bonded to each other due to atom diffusion caused in a boundary between the faces to be bonded in the base metal materials. According to this bonding method, it is possible to simultaneously bond the base metal materials at plural locations or in plural faces without being to plastic deformation. Thus, metal members having fine configurations can be even bonded to each other.

Nevertheless, due to the fact that the diffusion phenomenon is utilized, a bonding process needs longer time in comparison with the welding method, the brazing method and so forth. Usually, it is necessary to hold the metal members to be bonded at a given temperature over a time period of about 30 minutes or more than 30 minutes. Also, due to the fact that the bonding process involves pressurization, a bonding operation is troublesome, resulting in an increase in cost of the bonding process. Further, when each of the metal members to be bonded is composed of an aluminum alloy material, it is difficult to carry out the solid-phase diffusion bonding method due to the fact that the diffusion is hindered by a stable and firm oxide film existing over a surface of the aluminum alloy material. When each of the metal members to be bonded is composed of an aluminum alloy material which contains Mg falling within a range of about 0.5-1.0 mass %, it is possible to relatively easily carry out the bonding process because the oxide film can be demolished due to reduction of Mg. However, in other aluminum alloy materials, there is a problem that a specific cleaning process such as an argon ion bombardment cleaning process, a glow discharge cleaning process, a supersonic cleaning process and so forth is needed to remove the oxide film from an aluminum alloy material.

A friction stir bonding method, which is included in the friction bonding method, can be applied to all of the aluminum alloy materials. Due to the fact that the friction stir bonding method involves no melt of a base material, there is an advantage that members to be bonded to each other are not nearly subjected to deformation during a bonding process. Nevertheless, the members to be bonded to each other are limited to a linear configuration or a loose curved configuration, and it is difficult to bond members having a complicated configuration to each other. Also, due to the fact that a bonding tool is directly contacted with the members to be bonded, not only it is difficult to bond the members having fine configurations to each other, but also it is difficult to simultaneously bond the members at plural locations. Also, in this bonding method, it is impossible to avoid the remainder of a bonding pin mark on terminal ends of the members to be bonded to each other. Further, due to the fact that the members to be bonded to each other are stirred at the bond junction, a structure at the bond junction is different from that of the base material, and thus there is a problem that a bonding strength may be deteriorated.

As stated above, when members composed of aluminum materials are bonded to each other by the metallic bonding method, in general, the bonding methods, in which the members to be bonded are not melted or in which only the portions of the members to be bonded are locally melted, have been adopted as the metallic bonding method. This is because a desirable configuration cannot be obtained when the members to be bonded are wholly melted. Nevertheless, before a bonding process can be carried out at a practical rate, it is necessary to partially melt the members to be bonded, and thus deformation on the melted portions cannot be avoided. Therefore, there is a problem that design and assembly on the members to be bonded must be carried out, in anticipation of dimensional change and strength change to which the bonded members should be subjected after the bonding process.

On the other hand, a bonding method, which is carried out in a semi-melting state of metal members, has been proposed. In Patent Document 1, a bonding method utilizing a semi-melt state of alloy powder is proposed. In this bonding method, since alloy powders, which are defined as members to be bonded, are wholly in a semi-melt state, configurations of the members to be bonded are remarkably deformed, and thus the bonding method is unsuitable for a case where it is desired that the deformation of the members to be bonded is suppressed during a bonding process. Also, in Patent Document 2, is proposed a bonding method in which a nonmetallic member and a base alloy material are bonded to each other by pressing the nonmetallic member into the base alloy material in a semi-melting state. Nevertheless, in this bonding method, since the bonding is carried out with the use of a punch and a metal die, the resulting configuration of a product is limited.

Also, in Patent Document 3, is proposed a diffusion bonding method which is used to manufacture a waveguide antenna, and in which a slot plate forming a waveguide and a substrate composed of an Mg-based aluminum alloy are bonded by heating and exerting a pressure on them at a temperature which falls within a solid-liquid coexisting region of the aluminum alloy or which is in the vicinity of the solid-liquid coexisting region thereof. In the diffusion bonding method, the faces to be bonded to each other are pressurized by a tool using a wedge, and are further pressurized by utilizing a thermal expansion difference between the tool and the aluminum alloy, to thereby carry out the diffusion bond of the slot plate and the substrate. In this case, Patent Document 3 discloses that a liquid-phase ratio in the slot plate and the substrate is 1.7% at maximum as a bonding condition. Nevertheless, when the liquid-phase ratio is about 1.7%, an amount of a liquid phase material to be produced is too small, and thus there may be a case where the slot plate and the substrate cannot be bonded to each other at a sufficient strength. Also, in the method proposed by Patent Document 3, when the temperature is further elevated so that the liquid-phase ratio is increased, there may be case where a pressure exerted on the slot plate and the substrate is too much so that they are subjected to large deformation. Further, in this method, it is possible to bond only flat plate-like members to each other, and an orientation of the faces to be bonded is limited to the pressurizing direction.

In Patent Document 4, is proposed a method in which two members composed of respective metal alloys are received in a forging die, and in which a shaping and a bonding the two members are simultaneously carried out at a temperature which is set so that a solid-phase ratio of the two members falls within a range from 30% to less than 90% (a liquid-phase ratio thereof falling within a range from 10% to less than 70%). Since this method is to produce a composite material from the two members, it is impossible to bond the two members to each other so that configurations of the members before and after the bonding are maintained. Also, in this method, it is impossible to define a hollow between the two members to be bonded, and non-flat members cannot be bonded to each other. Further, in this method, a large-scale and high-temperature forging machine is needed.

PRIOR ART DOCUMENTS

Patent Documents

Patent Document 1: JP2005-030513 A
Patent Document 2: JP2003-088948 A
Patent Document 3: JP10-313214 A
Patent Document 4: JP Patent No. 4261705

Non-Patent Documents

Non-Patent Document: Welding/Bonding Technique Data Book, p 57, Welding/Bonding Technique Data Book Edition Committee (2007)

SUMMARY OF THE INVENTION

Problems to be Resolved by the Invention

In view of the problems of the above-mentioned prior arts, an object of the present invention is to provide a novel bonding method featuring superior bondability and high reliability, in which deformation deriving from a flowing of materials during a bonding process can be substantially avoided.

Means for Resolving the Problems

The inventors has found through their researches a novel bonding method which utilized liquid phases generated in a member to be bonded when an aluminum alloy material as a member to be bonded is heated, resulting in making the present invention. In particular, from one aspect, the present invention is directed to a method of bonding two members to each other wherein an aluminum alloy material is defined as one of the members to be bonded, and wherein either an aluminum alloy material or a pure aluminum material is defined as the other member to be bonded, which method is characterized in that the aluminum alloy material for the one member to be bonded and the aluminum alloy material for the other member to be bonded are composed of an aluminum alloy containing Mg of not more than 0.5 mass %; and that a bonding process is carried out in a non-oxidizing atmosphere at a temperature, at which a ratio of a mass of liquid phases generated in the aluminum alloy material defined as the one member to be bonded, to the total mass of the aluminum alloy material of the one member, falls within a range from 5% to 35%, under conditions that there is either a coated fluoride-based flux or a coated chloride-based flux between both the members to be bonded.

Also, from another aspect, the present invention is directed to a method of bonding the two members to each other wherein an aluminum alloy material is defined as one of the members to be bonded, and wherein either an aluminum alloy material or a pure aluminum material is defined as the other member to be bonded, which method is characterized in that the aluminum alloy material defined as the one member to be bonded is composed of an aluminum alloy containing Mg falling within a range from 0.2 mass % mass to 2.0 mass %; that the aluminum material defined as the other member to be bonded is composed of an aluminum alloy containing Mg of not more than 2.0 mass %; and that a bonding process is carried out in either a vacuum environment or a non-oxidizing atmosphere at a temperature, at which a ratio of a mass of liquid phases generated in the aluminum alloy material defined as the one member to be bonded, to the total mass of the aluminum alloy material of the one member, falls within a range from 5% to 35%.

Further, from still another aspect, the present invention is directed to the method of bonding the two members to each other, wherein a time period, over which the ratio of the mass of liquid phases generated in the aluminum alloy material defined as the one member to be bonded, to the total mass of the aluminum alloy material concerned is maintained so as to be at least 5%, falls within a range from 30 seconds to 3,600 seconds.

Further, from further aspect, the present invention is directed to the method of bonding the two members to each other, wherein the aluminum alloy for the aluminum alloy material defined as the one member to be bonded further contains Si falling within a range from 0.6 mass % to 3.5 mass %, and wherein, when an Si element content is defined as "X" (a dimensionless value indicating mass %), a temperature "T" (a value indicating ° C.) of the aluminum alloy is regulated by the following equations:

$$660-39.5X \leq T \leq 660-15.7X, \text{ and } T \geq 577$$

Further, from still another aspect, the present invention is directed to the method of bonding the two members to each other, wherein the aluminum alloy further contains one element or more than one elements selected from the group consisting of Cu falling within a range from 0.05 mass % to 0.5 mass %, Fe falling within a range from 0.05 mass % to 1.0 mass %, Zn falling within a range from 0.2 mass % to 1.0 mass %, Mn falling within a range from 0.1 mass % to 1.8 mass %, and Ti falling within a range from 0.01 mass % to 0.3 mass %.

Further, from still another aspect, the present invention is directed to the method of bonding the two members to each other, wherein the aluminum alloy for the aluminum alloy material defined as the one member to be bonded further contains Cu falling within a range from 0.7 mass % to 15.0 mass %, and wherein, when an Cu element content is defined as "Y" (a dimensionless value indicating mass %), a temperature "T" (a value indicating ° C.) of the aluminum alloy is regulated by the following equations:

$$660-15.6Y \leq T \leq 660-6.9Y \text{ and } T \geq 548$$

Further, from still another aspect, the present invention is directed to the method of bonding the two members to each other, wherein the aluminum alloy further contains one element or more than one elements selected from the group consisting of Si falling within a range from 0.05 mass % to 0.8 mass %, Fe falling within a range from 0.05 mass % to 1.0 mass %, Zn falling within a range from 0.2 mass % to 1.0 mass %, Mn falling within a range from 0.1 mass % to 1.8 mass %, and Ti falling within a range from 0.01 mass % to 0.3 mass %.

Further, from still another aspect, the present invention is directed to the method of bonding the two members to each other, wherein, when a maximum stress, produced in the member to be bonded in which the liquid phases are generated, is defined as "P" (a value indicating kPa), and when the ratio of the mass of liquid phases generated in the aluminum alloy material defined as the one member to be bonded, to the total mass of the aluminum alloy material of the one member, is defined as "V" (a dimensionless value indicating mass %), the bonding process is carried out so that the following equation is satisfied:

$$P \leq 460-12V$$

Further, from still another aspect, the present invention is directed to the method of bonding the two members to each other, wherein a sum of arithmetic average undulations Wa1 and Wa2, which are calculated based on bumps and dents on bonding faces of the both members to be bonded before the bonding process, is represented by the following equation:

$$Wa1+Wa2 \leq 10 \text{ } (\mu M)$$

Further, from still another aspect, the present invention is directed to the method of bonding the two members to each other, wherein a difference between a solidus temperature and a liquidus temperature in the aluminum alloy material defined as the one member to be bonded is at least 10° C.

Effects of the Invention

In a method of bonding two members to each other according to the present invention, the members are bonded by utilizing a small amount of liquid phases generated in one of the members or both the members. Thus, in the present invention, by utilizing a metal bonding featuring high reliability, the members composed of aluminum alloy material having the same composition can be bonded as well as it is possible to bond not only the respective members composed of an aluminum alloy material and a pure aluminum material but also the respective members composed of different aluminum alloy materials.

Also, in the present invention, due to the facts that, although a part of the member to be bonded is melted to be able to flow, the member itself does not become largely deformed and that a solder material, a brazing material, a filler material or the like is not at all used, a dimensional change, to which the member is subjected during the bonding process, is very small, so that there is almost no configuration change in the member. Especially, even when members having small passages are bonded to each other, it is possible to carry out a superior bonding process because the small passages are prevented from being obstructed due to flowing of liquid phases and deformation of the members.

Further, in the present invention, since a local change of a metal structure is not caused in the vicinity of a bond junction, embrittlement does not nearly take place in the bonded members. Also, it is possible to carry out a simultaneous plural-location bonding process, in which bond junctions are simultaneously obtained at plural locations, and which features reliability equivalent to that of a brazing process, without using a replace-brazing material, a brazing paste, a brazing sheet having a cladded brazing material, and so forth. Thus, according to the present invention, it is possible to reduce a material cost without damaging bondability.

Comparing the present invention with a diffusion bonding method in which not only deformation is small but also it is possible to carry out a simultaneous plural-location bonding process similar to the present invention, pressurization is unnecessary, and it is possible to shorten a time necessary for a bonding process. Also, even though aluminum alloy materials contain no Mg are bonded, it is possible to clean faces of the materials to be bonded without the use of a special cleaning process.

As stated above, according to the present invention, a novel bonding method, which has not conventionally existed, is provided. Thus, the novel bonding method according to the present invention may be named "bleed bonding".

BRIEF DESCRIPTION OF DRAWINGS

[FIG. 7] is a perspective view (a) and a side view (b) for explaining a sag test to estimate a deformation ratio.

EMBODIMENT FOR CARRYING OUT THE INVENTION

The present invention will now be explained in detail below.

A. Combination of Members to be Bonded

In a bleed bonding process for aluminum alloy materials according to the present invention, an aluminum alloy material is defined as one member to be bonded, either an aluminum alloy material or a pure aluminum alloy material is defined as another member to be bonded, and the one member and the other member are bonded to each other. When the aluminum alloy materials are bonded to each other, they may compose of the same alloy composition or may compose of different alloy compositions.

B. Generation of Liquid Phase

In the bleed bonding process for the aluminum alloy materials according to the present invention, it is necessary to carry out the bonding process at a temperature which is set so that a ratio (which is referred to as a liquid-phase ratio hereinafter) of a liquid-phase mass, which is generated in the aluminum alloy material defined as the one member to be bonded, to the total mass of the aluminum alloy material concerned falls within a range from 5% to 35%. When the liquid-phase ratio exceeds 35%, the generated liquid mass is too much so that the aluminum alloy material cannot be kept in shape, thereby resulting in large deformation of the aluminum alloy material. On the other hand, when the liquid-phase ratio is less than 5%, it is difficult to bond the members to each other. It is preferable that the liquid-phase ratio falls within the range of 5-35%, more preferably, 10-20%.

It is very difficult to measure a real liquid-phase ratio during a heating process. Thus, a liquid-phase ratio stipulated according to the present invention is calculated by an equilibrium calculation. Concretely, it is possible to calculate a liquid-phase ratio by using a thermodynamic equilibrium calculation program soft such as "Thermo-Calc" or the like.

Figure 1:
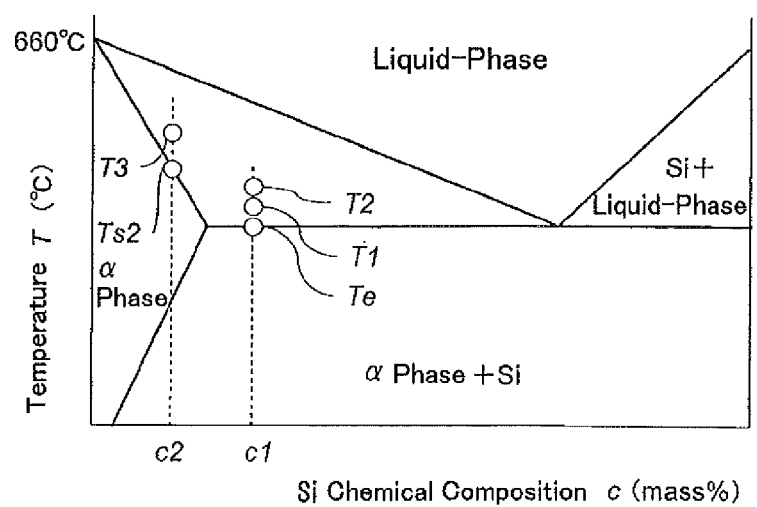
[FIG. 1] is a schematic phase diagram of Al—Si alloy which is defined as a binary eutectic alloy.
Figure 2:
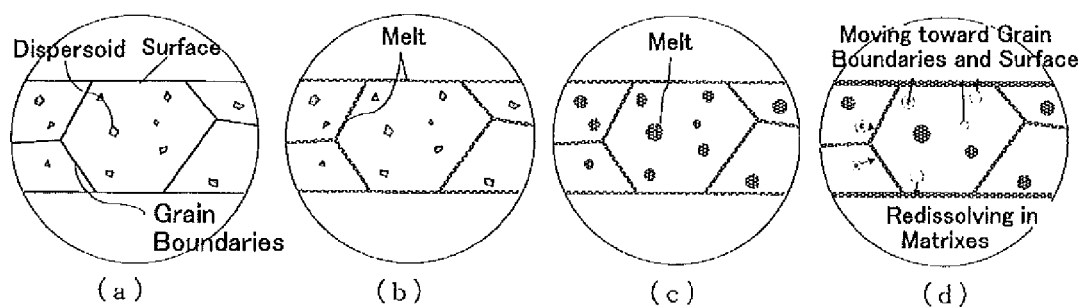
[FIG. 2] is explanatory views showing a liquid-phase generation mechanism in a bonding method for aluminum alloy materials according to the present invention.
Figure 3:
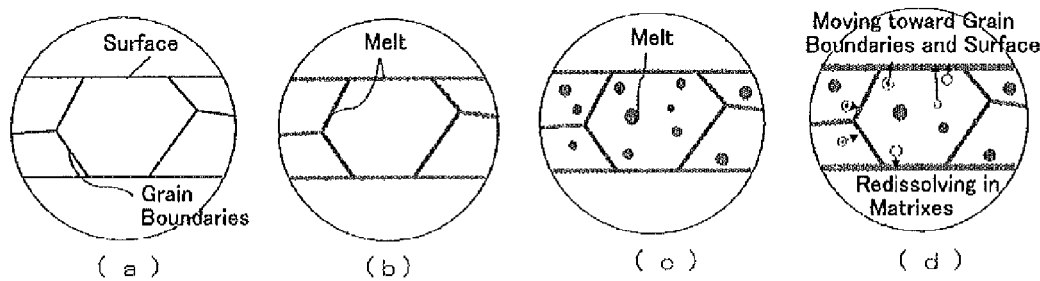
[FIG. 3] is other explanatory views showing the liquid-phase generation mechanism in the bonding method for the aluminum alloy materials according to the present invention.

Next, a liquid-phase generation mechanism will be explained. FIG. 1 is a schematic diagram showing a phase-state of Al—Si alloy which is defined as a representative binary eutectic alloy. When the aluminum alloy material having a Si composition "c1" is heated, generation of a liquid phase begins at a temperature "T1" which somewhat exceeds a eutectic temperature (solidus temperature) "Te". As shown in FIG. 2(a), at a temperature which is lower than the eutectic temperature "Te", dispersoids are distributed in matrixes sectioned by grain boundaries. When the generation of the liquid phase begins, as shown in FIG. 2(b), the grain boundaries featuring much segregation in the distribution of dispersoids are melted into liquid phases. Then, as shown in FIG. 2(c), dispersoid grains of Si, which are main additional elements dispersed in the matrixes of the aluminum alloy material, and peripheries of intermetallic compounds are melted into spherical liquid phases. Further, as shown in FIG. 2(d), as a time has elapsed, and as a temperature has been elevated, the spherical liquid phases generated in the matrixes are again dissolved in the matrixes due to grain boundary energies, and are moved toward the grain boundaries and the surface due to diffusion in solid. Subsequently, as shown in FIG. 1, when the temperature is elevated to "T2", an amount of the liquid phases is increased as being apparent from the phase diagram. As shown in FIG. 1, when the Si composition of the one aluminum alloy material is "c2" which is smaller than the maximum solubility limit composition, generation of a liquid phase begins at a temperature which somewhat exceeds a solidus temperature "Ts2". Provided that, differing from the case of "c1", there may be a case where no dispersoid exists in the matrixes just before the metal structure is melted. In this case, as shown in FIG. 3(b), first, the grain boundaries are melted into liquid phases. Thereafter, as shown in FIG. 3(c), generation of spherical liquid phases begins at locations at which a composition of solute elements is locally high in the matrixes. Similar to the case of "c1", as shown in FIG. 3(d), the spherical liquid phases generated in the matrixes are again dissolved in the matrixes due to grain boundary energies, and are moved toward the grain boundaries and the surface due to diffusion in solid. When the temperature is elevated to "T3", an amount of the liquid phases is increased as being apparent from the phase diagram. As stated above, the bleed bonding process according to the present invention utilizes the liquid phases which are locally generated in the interior of the aluminum alloy material, and thus bonding the members to each other and keeping the shape of the members can be consistent with each other.

C. Behavior of Metal Issues in Bonding

Figure 4:
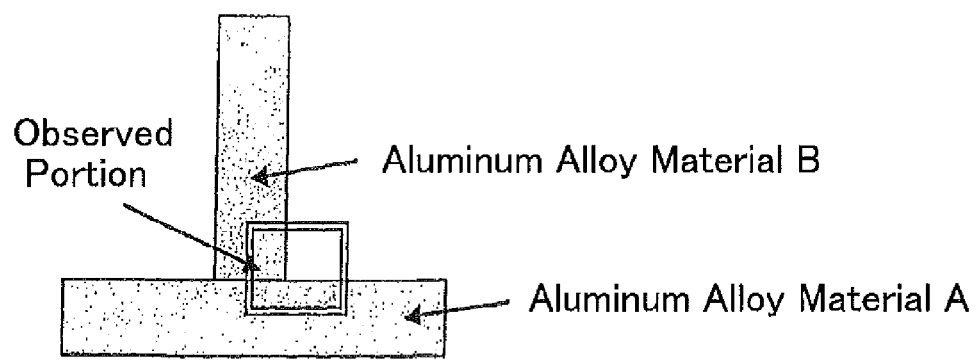
[FIG. 4] is a front view showing a reverse T-shaped bonding-test piece, in which an observed bonding portion is indicated.

Next, behavior of the metal structures from the generation of the liquid phases to the bonding will be explained. As shown in FIG. 4, a reverse T-shaped bonding-test piece was produced from an aluminum alloy material "A" in which liquid phases were generated, and another aluminum alloy material "B" which was bonded to the aluminum alloy material "A", and the portion indicated in the drawing was observed by a microscope. In the bonding process, a clearance between the aluminum alloy material "A" and the aluminum alloy material "B", an oxide film of which is demolished with flux or the like, was filled with a very small amount of liquid phases, which were generated in the surface of the aluminum alloy material "A", as mentioned above. While the liquid phases, which were in the vicinity of the bond junction between both the alloy materials, were moved into the aluminum alloy material "B", crystal grains of solid α-phases in the aluminum alloy material "A", which were in contact with the bond conjunction, grew into the aluminum alloy material "B". On the other hand, crystal grains in the aluminum alloy material "B" also grew into the aluminum alloy material "A".

Figure 5:
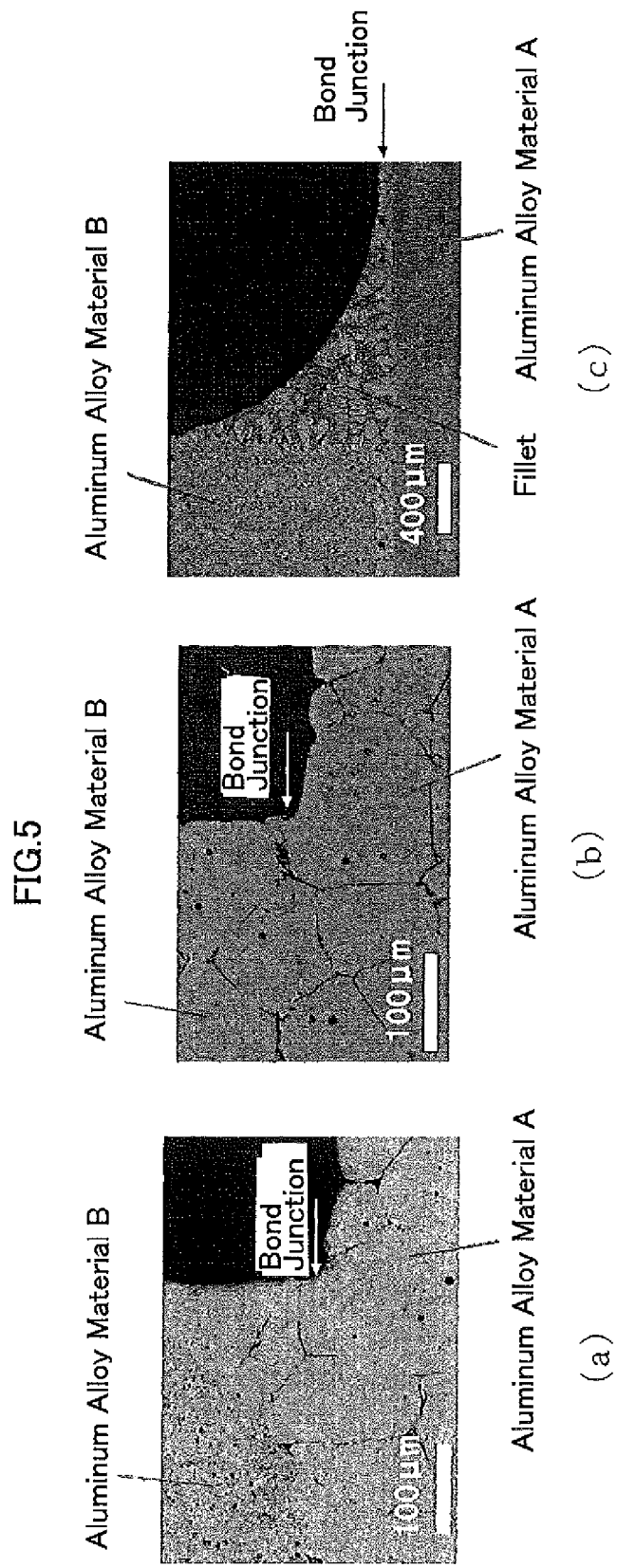
[FIG. 5] is microscope photographs of the observed bonding portion indicated in FIG. 4.

In the case where no liquid phase were generated in the aluminum alloy material "B", as shown in FIG. 5 (a), the aluminum alloy materials "A" and "B" were bonded to each other so that the structure of the aluminum alloy material "A" penetrated into the aluminum alloy material "B" in the vicinity of the bond junction. Thus, there was no metal structure in the bond junction except for the metal structures of the aluminum alloy materials "A" and "B". Also, in the case where the liquid phases were generated in the aluminum alloy material "B", as shown in FIG. 5 (b), both the metal structures of the alloy materials were completely integrated with each other, and thus it was impossible to distinguish the bond junction therebetween.

On the other hand, in the case where a brazing sheet having a cladded brazing material was substituted for the aluminum alloy material "A", and where an aluminum alloy material, in which liquid phases were generated, was substituted for the aluminum alloy material "B", as shown in FIG. 5(c), a fillet was formed in the bonded portion, and an eutectic structure was observed in the bonded portion. Like this, the metal structure shown in FIG. 5(c) was different from the respective metal structures shown in FIGS. 5(a) and (b). In the brazing process, since the bonded portion was filled with the liquid phase brazing material, the eutectic structure, which was different from the peripheral metal structure, was formed in the bonded portion. Similarly, in a welding process, since a bonded portion would be locally melted, it would have a metal structure different from another portion. In contrast, in the bleed bonding process according to the present invention, the metal structure in the bonded portion was derived from only both the materials, or was defined as the integrated metal structure of both the materials, and thus was different from the bonding metal structure obtained from the brazing process or the welding process.

Due to the bonding behavior as stated above, a configuration of both the materials, which was in the vicinity of the bonded portion, was not nearly changed after the bonding process was completed. In particular, in the bonding method according to the present invention, there was almost no configuration change in the bonded materials, which would be caused by either a bead derived from the welding method or a fillet derived from the brazing method after the bonding process. For example, when a drawn-cup/lamination type heat exchanger was assembled by using a brazing sheet (featuring the 5% clad ratio of brazing material on one surface thereof), the melted brazing material was concentrated into the bonded portions so that the lamination type heat exchanger was reduced in height by 5-10%. Thus, in a product design, it was necessary to take the reduction of height into consideration. In the bleed bonding process according to the present invention, a dimensional change is very small after the bonding process is completed, and thus it is possible to carry out a product design with high precision.

D. Demolition of Oxide Film

An oxide film is formed over an aluminum alloy material, and is an obstacle to a bonding process. Thus, it is necessary to demolish the oxide film. In the bleed bonding process according to the present invention, one of the methods stated in the following "D-1" and "D-2" is used for the demolition of the oxide film.

D-1. Demolition of Oxide Film with Flux

In this method, a portion to be bonded is at least coated with a flux for the demolition of the oxide film. For the flux, it is possible to use a fluoride-based flux such as $KAlF_4$, $CsAlF_4$ and so forth, and a chloride-based flux such as KCl, NaCl and so forth, which are used in a brazing process for aluminum alloy materials. In the bleed bonding process according to the present invention, before the liquid phases are melted or before the bonding temperature is attained, each of the fluxes is melted so as to react with the oxide film, resulting in demolition of the oxide film.

Further, in this method, in order to suppress formation of the oxide film, the bonding process is carried out in a non-oxidizing atmosphere which is defined with a nitrogen gas, an argon gas or the like. Especially, when the fluoride-based flux is used, it is preferable that the bonding process is carried out in the non-oxidizing atmosphere in which an oxygen density is less than 250 ppm, and in which a dew point is less than −25° C.

Also, when the fluoride-based flux is used, and when the aluminum alloy materials of the members to be bonded contain Mg exceeding 0.5 mass %, the flux and Mg react with each other so that the demolition of the oxide film is diminished. Accordingly, when the one and other members to be bonded are composed of aluminum alloy materials, each of these aluminum alloy materials contains Mg of not more than 0.5 mass %. Note, as long as the condition that the Mg content is not more than 0.5 mass % is satisfied, a sort and a content of another element to be contained in the aluminum alloy are not subjected to limitation.

D-2. Demolition of Oxide Film by Gettering Action of Mg

In a case where a given content of Mg is added to an aluminum alloy material, although a portion to be bonded is not coated with a flux, the oxide film can be demolished so that it is possible to carry out a bonding process. In this case, similar to a case of a vacuum fluxless brazing process, when the aluminum alloy material is melted so liquid phases appear on the surface thereof, the oxide film is demolished by a gettering action of Mg evaporated from the aluminum alloy material.

In the case where the oxide film is demolished by the gettering action of Mg, in order to suppress formation of the oxide film, the bonding process is carried out in a vacuum state or the above-mentioned non-oxidizing atmosphere. However, when a face bonding process is carried out or when a bonding process is carried out in a closed space, there may be a case where the bonding process can be carried out in a dried atmosphere. When the bonding process is carried out in the non-oxidizing atmosphere or the dried atmosphere, it is preferable to control a dew point so as to be less than −25° C.

In order that the oxide film can be demolished by the gettering action of Mg, the aluminum alloy material of the one member to be bonded should contain Mg falling within a range from 0.2 mass % to 2.0 mass %. When the Mg content is less than 0.2 mass %, a sufficient gettering action cannot be obtained so that a superior bonding is not attained. On the other hand, when the Mg content exceeds 2.0 mass %, Mg reacts with oxygen in the atmosphere on the surface, much oxide MgO is produced, resulting in diminution of the bonding. Note, the reason why only the Mg content of the one member to be bonded should fall within the range from 0.2 mass % to 2.0 mass % is that the sufficient gettering action of Mg can be obtained by the one member to be bonded. Although the Mg content of the aluminum alloy material of the other member to be bonded is not limited to more than 0.2 mass %, since the bonding is diminished when much MgO is produced, the Mg content should be less than 2.0 mass %. Also, as long as the condition that Mg falls within the range from 0.2 mass % to 2.0 mass % is satisfied, a sort and a content of another element to be contained in the aluminum alloy are not subjected to limitation.

E. Lower Limit of Time Necessary for Generation of Liquid Phases

In the bonding process according to the present invention, after the oxide film is demolished in the portion to be bonded, the clearance between both the members to be bonded is filled with the liquid phases so that the bonding of both the members is attained. The liquid phases are generated in the aluminum alloy material of the one member to be bonded. In order that the clearance between both the members to be bonded is sufficiently filled with the liquid phases, it is preferable that a time period, over which the liquid-phase ratio of at least 5% is maintained, is at least 30 seconds. More preferably, the time period, over which the liquid-phase ratio of at least 5% is maintained, is at least 60 seconds, so that the clearance between both the members to be bonded is further sufficiently filled with the liquid phases, resulting in attainment of a secure bonding. Note, in the bonding process according to the present invention, since movement of the liquid phases in the clearance between both the members to be bonded is very small, a time necessary to fill the clearance with the liquid phases does not depend on a size of the clearance between both the members to be bonded. Also, note, liquid phases may be generated in the aluminum alloy material of the other member to be bonded, and it is also preferable that a time period, over which the liquid-phase ratio of at least 5% is maintained, is at least 30 seconds, more preferably, at least 60 seconds.

F. Upper Limit of Time Necessary for Configuration Maintenance

According to the present invention, in the aluminum alloy material of the one member to be bonded, in which the liquid phases are generated, it is preferable that a time period, over which the liquid-phase ratio of at least 5% is maintained, is not more than 3,600 seconds. When the time period exceeds 3,600 seconds, the member to be bonded may be subjected to large deformation even though the liquid-phase ratio of not more than 35%. More preferably, the time period, over which the liquid-phase ratio of at least 5% is maintained, is not more than 1,800 seconds, so that it is possible to securely suppress a configuration change of the one member to be bonded. Note, in the case where the liquid phases are generated in the aluminum alloy material of the other member to be bonded, it is also preferable that a time period, over which the temperature is at least solidus temperature, is not more than 3,600 seconds, more preferably, not more than 1,800 seconds.

G. Content of Additional Element in Aluminum Alloy Material

For example, a content of a main additional element in the aluminum alloy material, in which the liquid phases are generated, can be set based on a binary alloy equilibrium phase diagram, as stated below. When a bonding temperature is defined as "T" (° C.), when an addition content of a main additional element to aluminum is defined as "X" (mass %), when an eutectic temperature is defined as "Te" (° C.), when a solubility limit of the main additional element to the aluminum is defined as "a" (mass %), and when a content of the main additional element at an eutectic point is "b" (mass %), by carrying out a bonding process so that the following equation (1) is satisfied, it is possible to obtain a better liquid-phase ratio:

$(0.05/a+0.95/b) \times (Te-660) \times T+660 < X < (0.35/a+0.65/b) \times (Te-660) \times T+660$ (1)

If "X" is equal to or less than $(0.05/a+0.95/b) \times (Te-660) \times T+660$, there may be a case where an amount of generated liquid phases is not sufficient so that it is difficult to carry out the bonding process. On the other hand, if "X" is equal to or more than $(0.35/a+0.65/b) \times (Te-660) \times T+660$, there may be a case where an amount of generated liquid phases is too large so that a large deformation may be caused. Thus, it is desirable that the addition content "X" of the additional element is set so as to satisfy the equation (1).

H. Especially Suitable Alloy for This Invention

As mentioned hereinbefore, when a flux is used to demolish the oxide film, for the one and other members to be bonded, the aluminum alloy featuring the Mg content of not more than 0.5 mass % is used. When the gettering action of Mg is utilized to demolish the oxide film, for the aluminum alloy material of the one member to be bonded, the aluminum alloy featuring the Mg content falling within the range from 0.2 mass % to 2.0 mass % is used, and, for the aluminum alloy material of the other member to be bonded, the aluminum alloy featuring the Mg content of not more than 2.0 mass % is used.

For the aluminum alloy material of the one member to be bonded, an Al—Si alloy or an Al—Si—Mg alloy, which contains an Si element as an indispensable component, may be used. When each of these alloys features the Si content "X" (mass %) falling within a range from 0.6 mass % to 3.5 mass %, it can be suitably used. When the Si content "X" is less than 0.6%, a temperature range for obtaining the liquid-phase ratio falling within the range from 5% to 35% becomes narrow, so that there may be a case where it is difficult to stably carry out the bonding process. On the other hand, when the Si content "X" exceeds mass 3.5%, an amount of liquid phases generated at the solidus temperature=the eutectic temperature approaches 35%, and thus a temperature range for obtaining the liquid-phase ratio of 35% from the solidus temperature becomes narrow, so that there may be a case where it is difficult to stably carry out the bonding process. More preferably, the Si content should fall within a range from 1.2 mass % to 3.0 mass %.

Also, each of the aforesaid Al—Si alloy and Al—Si—Mg alloy may further contain one or two elements selected from the group consisting of Cu falling within a range from 0.05 mass % to 0.5 mass %, Fe falling within a range from 0.05 mass % to 1.0 mass %, Zn falling within a range from 0.2 mass % to 1.0 mass %, Mn falling within a range from 0.1 mass % to 1.8 mass %, and Ti falling within a range from 0.01 mass % to 0.3 mass %.

In short, it is possible to suitably use the aluminum alloy material comprising the aluminum alloy: which features the Mg content of not more than 0.5 mass % or the Mg content falling within the range from 0.2 mass % to 2.0 mass %; which contains Si, as the indispensable element, falling within the range from 0.6 mass % to 3.5 mass %; which further contains one or two elements selected from the group consisting of Cu falling within the range from 0.05 mass % to 0.5 mass %, Fe falling within the range from 0.05 mass % to 1.0 mass %, Zn falling within the range from 0.2 mass % to 1.0 mass %, Mn falling within the range from 0.1 mass % to 1.8 mass %, and Ti falling within the range from 0.01 mass % to 0.3 mass %; and which is composed of the balance Al and the inevitable impurities.

When the aluminum alloy material composed of each of the aforesaid Al—Si alloy and Al—Si—Mg alloy is bonded as the one member to be bonded to the other member to be bonded, it is preferable to control a temperature T of the one member to be bonded, so that the conditions of 660−39.5X≤T≤660−15.7X and T≥577 are satisfied Thus, it is possible to attain a further superior bonding.

For the aluminum alloy material of the one member to be bonded, an Al—Cu alloy or an Al—Cu—Mg alloy, which contains a Cu element as an indispensable component, may be used. When each of these alloys features the Cu content "Y" (mass %) falling within a range from 0.7 mass % to 15.0 mass %, it can be suitably used. When the Cu content "Y" is less than 0.7%, a temperature range for obtaining the liquid-phase ratio falling within the range from 5% to 35% becomes narrow, so that there may be a case where it is difficult to stably carry out the bonding process. On the other hand, when the Si content "Y" exceeds mass 15.0%, an amount of liquid phases generated at the solidus temperature=the eutectic temperature approaches 35%, and thus a temperature range for obtaining the liquid-phase ratio of 35% from the solidus temperature becomes narrow, so that there may be a case where it is difficult to stably carry out the bonding process.

More preferably, the Cu content should fall within a range from 1.5 mass % to 12.0 mass %.

Also, each of the aforesaid Al—Cu alloy and Al—Cu—Mg alloy may further contain one or two elements selected from the group consisting of Si falling within a range from 0.05 mass % to 0.8 mass %, Fe falling within a range from 0.05 mass % to 1.0 mass %, Zn falling within a range from 0.2 mass % to 1.0 mass %, Mn falling within a range from 0.1 mass % to 1.8 mass %, and Ti falling within a range from 0.01 mass % to 0.3 mass %.

In short, it is possible to suitably use the aluminum alloy material comprising the aluminum alloy: which features the Mg content of not more than 0.5 mass % or the Mg content falling within the range from 0.2 mass % to 2.0 mass %; which contains Cu, as the indispensable element, falling within the range from 0.7 mass % to 15.0 mass %; which further contains one or two elements selected from the group consisting of Si falling within the range from 0.05 mass % to 0.8 mass %, Fe falling within the range from 0.05 mass % to 1.0 mass %, Zn falling within the range from 0.2 mass % to 1.0 mass %, Mn falling within the range from 0.1 mass % to 1.8 mass %, and Ti falling within the range from 0.01 mass % to 0.3 mass %; and which is composed of the balance Al and the inevitable impurities.

When the aluminum alloy material composed of each of the aforesaid Al—Cu alloy and Al—Cu—Mg alloy is bonded as the one member to be bonded to the other member to be bonded, it is preferable to control a temperature T of the one member to be bonded, so that the conditions of $660-15.6Y \leq T \leq 660-6.9Y$ and $T \geq 548$ are satisfied (again, noting that "Y" and "T" are dimensionless values). Thus, it is possible to attain a further superior bonding.

I. Stress Exerted on Both Members to be Bonded

In the bonding process according to the present invention, when both the members to be bonded are in contact with each other at a bonding location, it is not always necessary to exert a pressure on the faces to be bonded. Nevertheless, in processes for manufacturing real products, there are many cases where stresses are exerted on both of the members to be bonded, using jigs, tools and so forth, to thereby clamp them or to thereby eliminate a clearance therebetween. Also, stresses are produced in both the members to be bonded due to the own weights thereof. In this case, the stresses produced in various regions of both the members to be bonded can be calculated based on the weights and configurations thereof. For example, the calculation is performed by using a structure calculation program and so forth. In the present invention, when the largest one (maximum stress) of the stresses produced in the various regions of the member to be bonded, in which liquid phases are generated during the bonding process, is defined as "P" (a value indicating kPa), and when the liquid-phase ratio of the aluminum ally of the member concerned is defined as "V" (a dimensionless value indicating mass %), it is preferable to carry out the bonding process so that the condition of $P \leq 460-12V$ is satisfied. In this equation, the right side represents a value of a critical stress. When a stress exceeding the critical stress is exerted on the member to be bonded, in which the liquid-phases are generated, the member to be bonded may be subjected to large deformation even though the liquid-phase ratio is equal to or less than 35%. Note, when the liquid phases are generated in both the members to be bonded, the respective conditions of $P \leq 460-12V$ are calculated based on the stresses "P" and liquid phase ratios "V" of both the members to be bonded, the bonding process is carried out so that the conditions of $P \leq 460-12V$ are simultaneously satisfied on both the members to bonded.

J. Undulation on Bonding Face of Member to be Bonded

In the bonding process according to the present invention, since an amount of liquid phases generated in the one member to be bonded is small, both the members to be bonded must be placed so as to be in contact with each other. Nevertheless, fine clearances may be defined between the faces to be bonded in both the members, due to distortion or undulation of the materials. Especially, when the undulation is represented by bumps and dents which feature wavelengths falling within a range from 25 μm to 2500 μm, it has a non-negligible quantity as the clearances between the faces to be bonded, and thus it is difficult to reform the undulation by using jigs and tools.

In the present invention, when the sum of arithmetic average undulations Wa1 and Wa2, which are calculated based on the dumps and dents on the faces to be bonded in both the members before the bonding process, satisfies the condition of $Wa1+Wa2 \leq 10$ (μm), it is possible to successfully and sufficiently attain the bonding process. Note, the arithmetic average undulations Wa1 and Wa2 are normalized in JISB0633, and are calculated based on undulation curves measured by a laser microscope or a confocal microscope, with a cutoff value being set so that only undulations which feature wavelengths falling within the range from 25 μm to 2500 μm can be detected.

K. Difference Between Solidus and Liquidus Temperatures

In the bleed bonding process according to the present invention, a differential temperature between a solidus temperature and a liquidus temperature on an aluminum alloy material, in which the liquid phases are generated, is preferably set so as to be at least 10° C. When a temperature exceeds the solidus temperature, generation of the liquid phases begins. Nevertheless, when the differential temperature between the solidus temperature and the liquidus temperature is small, a temperature range, in which the solid and the liquid can coexist, becomes narrower, so that it is difficult to control an amount of liquid phases to be generated. Thus, it is preferable to make the differential temperature to be at least 10° C. For example, as a binary aluminum alloy featuring components which can satisfy this condition, there named an Al—Si based alloy, an Al—Cu based alloy, an Al—Mg based alloy, an Al—Zn based alloy, an Al—Ni based alloy and so forth. In order to satisfy this condition, the aforesaid eutectic alloy is advantageous because it features a large solid-liquid coexisting region. Nevertheless, in another alloy such as a solid/state-complete/solubility type alloy, a peritectic alloy, a monotectic alloy, and so forth, as long as the differential temperature between the solidus temperature and the liquidus temperature is at least 10° C., it is possible to attain a superior bonding. Also, since each of the aforesaid binary alloys may contain some additional elements except for the main additional element, ternary alloys, quaternary alloys, pentanary alloys and multi-component type alloys are substantially included in the present invention. For example, there are an Al—Si—Mg based alloy, an Al—Si—Cu based alloy, an Al—Si—Zn based alloy, an Al—Si—Cu—Mg based alloy and so forth. Note, as the differential temperature between the solidus temperature and the liquidus temperature becomes larger, it is possible to more easily and suitably control the amount of the liquid phases. Accordingly, an upper limit of the differential temperature between the solidus temperature and the liquidus temperature is not especially set. It is preferable to set the differential temperature, at which the liquid-phase ratio falling within the range from 5% to 35% can be obtained, to be at least 10° C. More preferably, the differential temperature, at which the liquid-phase ratio falling within the range from 5% to 35%, is to be set at least 20° C.

Crystal Grain Diameter after Bonding Process

In the aluminum alloy material in which the liquid phases are generated, after it is heated at the bonding temperature, it is preferable that a diameter of the crystal grains in the matrix is at least 50 μm. Usually, at a high temperature and under a low stress, an aluminum alloy is subjected to deformation due to grain boundary sliding caused by displacement in the grain boundaries, prior to plastic deformation of crystal grains themselves.

Especially, in the solid-liquid coexisting region during the bonding process according to the present invention, the grain boundaries are previously melted. In this case, when the diameter of the crystal grains is small, a number of the crystal grains per a unit volume become larger, so that deformation easily takes place due to the grain boundary sliding. Also, when the diameter of the crystal grains in the solid-liquid coexisting region is too small, the grain boundary sliding is easily caused by the own weight, so that a large configuration change may take place during the heating process. It is difficult to directly measure the diameter of the crystal grains in the solid-liquid coexisting region during the bonding process. Thus, a relationship between the diameter of the crystal grains during the bonding process and the diameter of the crystal grains after the heating/bonding process was researched. Since It is difficult to directly measure the diameter of the crystal grains in the solid-liquid coexisting region during the bonding process, a cooling process (in which the temperature was lowered to 40° C. at the rate of 30° C./min. after the heating process) was carried out in a usual brazing furnace, and then the diameter of the crystal grains was measured. The measured diameter was considered to be the diameter of the crystal grains during the bonding process. On the other hand, after the heating/bonding process was carried out, a water cooling process was immediately carried out, and then the diameter of the crystal grains was measured. The measured diameter was considered to be the diameter of the crystal grains after the heating/bonding process. Then, both the diameters were compared with each other, and it was found that the both the diameters were substantially identical with each other. That is, it was found that the diameter of the crystal grains after the heating/bonding process was equivalent to the diameter of the crystal grains in the solid-liquid coexisting region during the bonding process. Thus, in the present invention, the diameter of the crystal grains in the solid-liquid coexisting region during the bonding process can be estimated as the diameter of the crystal grains after the heating/bonding process. Accordingly, it is preferable to set a lower limit of the diameter of the crystal grains after the heating process to be 50 μm. When the diameter of the crystal grains is less than 50 μm, the grain boundary sliding is easily caused by the own weight. Thus, when the bonding process is prolonged, the deformation may be facilitated. Note, the measurement of the diameters of the crystal grains was performed by a cutting method based on JIS H:501.

M. Bonding Method

In the bonding method according to the present invention, usually, the members to be bonded are heated in a furnace. A form of the furnace is not especially limited. For example, it is possible to utilize a one-chamber type batch furnace, a continuos furnace used in manufacture of a heat exchanger for an automobile, and so forth. Note, although an atmosphere in the furnace is not especially limited, it is preferable to carry out the bonding method in a non-oxidizing atmosphere, as stated above.

An oxide film is formed over an aluminum material, so that the bonding process may be diminished. Thus, it is necessary to demolish the oxide film in the bonding process. In the bonding process according to the present invention, it is preferable that faces to be bonded are coated with a flux. Also, in order to suppress formation of an oxide film, it is preferable to carry out the bonding process in an atmosphere of non-oxidizing gas such as nitrogen gas or the like. More preferably, not only the faces to be bonded are coated with a flux, but also the bonding process is carried out in the atmosphere of non-oxidizing gas. Note, in a case where Mg is added to an aluminum alloy material, by using a vacuum furnace or a non-oxidizing furnace, it is possible to remove the oxide film from the surface of the aluminum alloy material by the gettering action of Mg.

EXAMPLES

Next, based on examples and comparative examples, the present invention will further explained in detail.

Example I

Examples 1 to 26 and Comparative Examples 27 to 33

In TABLE 1, respective compositions of Al—Si alloys (Alloy Nos. 1 to 5) and Al—Cu alloys (Alloy Nos. 6 and 7) used in bonding processes are shown. Each of the alloys (Alloy Nos. 1 to 7) features a Mg content of not more than 0.5 mass % specified in claim 1. Also, in TABLE 1, upper limit values and lower limit values on one of the two inequalities specified in each of claims 4 and 6, and respective equilibrium liquid-phase ratios in temperatures falling with in the range from 580° C. to 635° C. are shown. Note, the equilibrium liquid-phase ratios are values calculated based on "Thermo-Calc". After each of ingots of the alloys shown in TABLE 1 was prepared, it was rolled by a hot rolling process and a cold rolling process into a sheet having a thickness of 1 mm. Then, the rolled sheet was passed through a leveler, and was subjected to an annealing process over a time period of two hours at a temperature of 380° C., resulting in production of a rolled sheet sample. Using the rolled sheet sample, a bonding ratio and a deformation ratio were estimated.

TABLE 1

| Alloy Number | Alloy Composition (mass %) | | | | | | | | | Equilibrium Liquid-Phase Ratio (Calculated Value) (%) | | | | | | |
|---|---|---|---|---|---|---|---|---|---|---|---|---|---|---|---|---|
| | Si | Fe | Cu | Mg | Zn | Ti | Al | | | 580° C. | 590° C. | 600° C. | 610° C. | 620° C. | 630° C. | 635° C. |
| | | | | | | | | 660-39.5X | 660-15.7X | | | | | | | |
| 1 | 1.5 | 0.2 | 0.02 | 0.001 | 0.01 | 0.02 | Balance | 600.8 | 636.5 | 0.0 | 2.1 | 5.1 | 9.8 | 15.4 | 23.8 | 30.5 |
| 2 | 2 | 0.2 | 0.02 | 0.001 | 0.01 | 0.02 | Balance | 581.0 | 628.6 | 4.7 | 7.7 | 11.8 | 16.9 | 23.6 | 34.7 | 43.6 |
| 3 | 2.5 | 0.2 | 0.02 | 0.001 | 0.01 | 0.02 | Balance | 561.3 | 620.8 | 9.7 | 13.3 | 18.0 | 23.6 | 32.0 | 45.8 | 56.7 |
| 4 | 3 | 0.2 | 0.02 | 0.001 | 0.01 | 0.02 | Balance | 541.5 | 612.9 | 14.6 | 18.9 | 23.8 | 30.5 | 40.5 | 56.9 | 69.9 |
| 5 | 4 | 0.2 | 0.02 | 0.001 | 0.01 | 0.02 | Balance | 502.0 | 597.2 | 24.3 | 29.2 | 35.6 | 44.4 | 57.6 | 79.2 | 96.4 |
| | | | | | | | | 660-15.6Y | 660-6.9Y | | | | | | | |
| 6 | 0.1 | 0.2 | 3.0 | 0.001 | 0.01 | 0.02 | Balance | 613.2 | 639.3 | 0.0 | 0.0 | 5.3 | 9.5 | 15.4 | 23.5 | |
| 7 | 0.1 | 0.2 | 6.0 | 0.001 | 0.01 | 0.02 | Balance | 566.4 | 618.6 | 11.2 | 16.2 | 22.4 | 28.7 | 37.9 | 52.9 | |

(1) Estimation of Bonding Ratio

Figure 6:
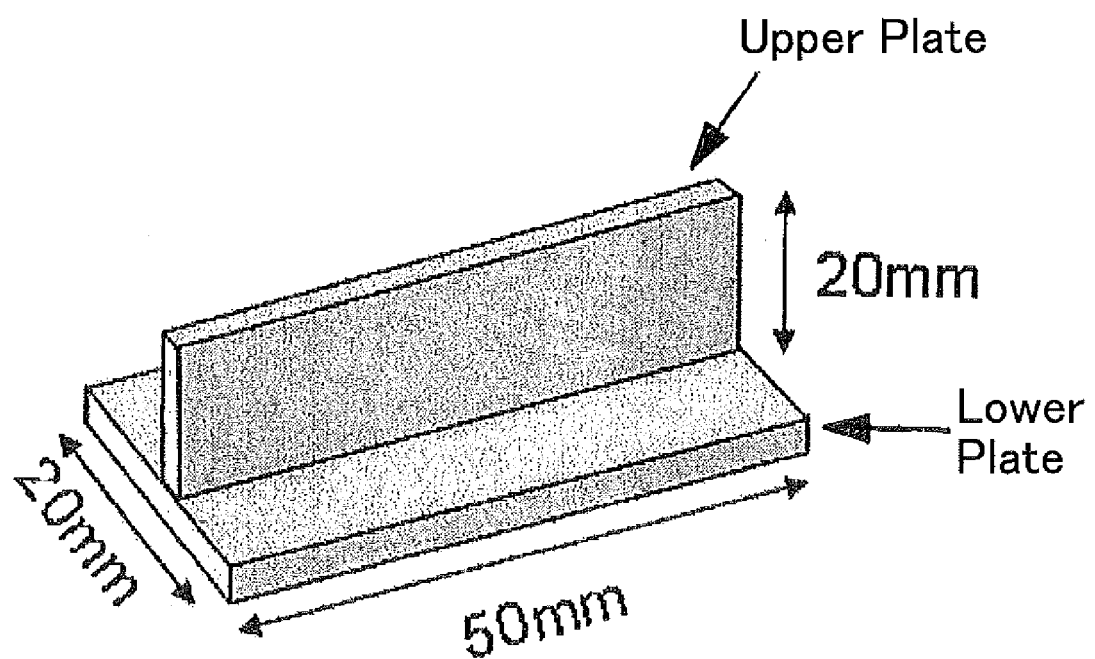
[FIG. 6] is a perspective view showing a reverse T-shaped bonding-test piece for estimating a bonding ratio.

Two plates having a width of 20 min and a length of 50 mm were cut off from the aforesaid rolled sheet sample, and end faces of each of these plates were smoothed by a milling machine. Then, the two respective plates were defined as upper and lower plates composed of aluminum alloy materials, and were combined with each other so as to produce a reverse T-shaped bonding-test piece, as shown in FIG. 6. The upper and lower plates of each of the bonding-test pieces thus produced were composed of a corresponding one of the aluminum alloy materials featuring the respective compositions shown in TABLE 1. In TABLE 2, each of the Examples represents a combination of the upper and lower plates in each of the bonding-test pieces. In each of the bonding-test pieces, the aluminum alloy compositions of the upper and lower plates were the same, and the plates composed of the aluminum alloy plates featuring the same composition were bonded to each other. In each of the bonding-test pieces, the faces to be bonded were coated with a potassium-fluoride based non-corrosive flux. In FIG. 6, the dimensions of the upper and lower plates are also indicated. Note, in each of the bonding-test pieces, the surfaces of both the members to be bonded have arithmetic average undulations Wa1 and Wa2 of not more than 1.0 μm. Also, note, in each of the bonding-test pieces, the end face of the upper plate, which was defined as the face to be bonded, also has an arithmetic average undulation Wa of not more than 1.0 μm. Such arithmetic average undulations Wa1, Wa2 and Wa are the same for the below-mentioned EXAMPLES II, III, IV and VI.

Each of the aforesaid bonding-test pieces was put in a nitrogen atmosphere, and then was heated to a given temperature (referred to as a bonding temperature in TABLE 2). After this condition was maintained over a time period of 180 seconds, the bonding-test piece was naturally cooled in the furnace. The nitrogen atmosphere was controlled so that an oxygen density was not more than 100 ppm, and so that a dew point was not more than −45° C. An elevation rate of the temperature was 10° C./minute in a range of not less than 520° C.

After the heating/bonding process, in each of the bonding-test pieces, a bonding ratio was calculated as below. First, using a ultrasonic flaw detector, a bonding length of a really-bonded area in an bond junction of each of the bonding-test pieces was measured. Then, based on the fact that the full length of each of the reverse Y-shaped bonding-test pieces was 50 mm, the bonding ratio (%) was calculated by the following equation:

[Length (mm) of Really-Bonded Area in Test Piece/50 mm]×100

In estimation, a case where a bonding ratio was at least 95% was estimated by symbol "⊚"; a case where a bonding ratio was at least 90% and less than 95% was estimated by symbol "○"; a case where a bonding ratio was at least 25% and less than 90% was estimated by symbol "Δ"; and a case where a bonding ratio was less than 25% was estimated by symbol "×".

TABLE 2

| | | Bonding-Conditions | | Test Results | | |
| | | Bonding | Equilibrium Liquid-Phase Ratio (Calculated | | | |
| | Alloy Number | Temperature (° C.) | Value) (%) | Bonding Ratio | Deformation Ratio | Comprehensive Judgement |
| --- | --- | --- | --- | --- | --- | --- |
| Example 1 | 1 | 600 | 5.1 | ○ | ⊚ | ○ |
| Example 2 | 1 | 620 | 15.4 | ⊚ | ⊚ | ⊚ |
| Example 3 | 1 | 630 | 23.8 | ⊚ | ○ | ○ |
| Example 4 | 1 | 635 | 30.5 | ⊚ | ○ | ○ |
| Example 5 | 2 | 590 | 7.7 | ○ | ⊚ | ○ |
| Example 6 | 2 | 600 | 11.8 | ⊚ | ⊚ | ⊚ |
| Example 7 | 2 | 620 | 23.6 | ⊚ | ○ | ○ |
| Example 8 | 2 | 630 | 34.7 | ⊚ | ○ | ○ |
| Example 9 | 3 | 580 | 9.7 | ○ | ⊚ | ○ |
| Example 10 | 3 | 590 | 13.3 | ⊚ | ⊚ | ⊚ |
| Example 11 | 3 | 600 | 18.0 | ⊚ | ⊚ | ⊚ |
| Example 12 | 3 | 620 | 32.0 | ⊚ | ○ | ○ |
| Example 13 | 4 | 580 | 14.6 | ⊚ | ⊚ | ⊚ |
| Example 14 | 4 | 590 | 18.9 | ⊚ | ⊚ | ⊚ |
| Example 15 | 4 | 600 | 23.8 | ⊚ | ○ | ○ |
| Example 16 | 4 | 610 | 30.5 | ⊚ | Δ | Δ |
| Example 17 | 5 | 580 | 24.3 | ⊚ | ○ | ○ |
| Example 18 | 5 | 590 | 29.2 | ⊚ | ○ | ○ |
| Example 19 | 6 | 600 | 5.3 | ○ | ⊚ | ○ |
| Example 20 | 6 | 610 | 9.5 | ○ | ⊚ | ○ |
| Example 21 | 6 | 620 | 15.4 | ⊚ | ⊚ | ⊚ |
| Example 22 | 6 | 630 | 23.5 | ⊚ | ⊚ | ⊚ |
| Example 23 | 7 | 580 | 11.2 | ⊚ | ⊚ | ⊚ |
| Example 24 | 7 | 590 | 16.2 | ⊚ | ⊚ | ⊚ |
| Example 25 | 7 | 600 | 22.4 | ⊚ | ⊚ | ⊚ |
| Example 26 | 7 | 610 | 28.7 | ⊚ | ○ | ○ |
| Comparative Example 27 | 1 | 590 | 2.1 | X | ⊚ | X |
| Comparative Example 28 | 2 | 635 | 43.6 | ⊚ | X | X |
| Comparative Example 29 | 3 | 630 | 45.8 | ⊚ | X | X |
| Comparative Example 30 | 4 | 620 | 40.5 | ⊚ | X | X |
| Comparative Example 31 | 5 | 600 | 35.6 | ⊚ | X | X |
| Comparative Example 32 | 6 | 590 | 0.0 | X | ⊚ | X |
| Comparative Example 33 | 7 | 620 | 37.9 | ⊚ | X | X |

(2) Estimation of Deformation Ratio

Plates having a width of 10 mm and a length of 30 mm were cut off from the aforesaid rolled sheet sample, and were used as plate-like test pieces for measuring a deformation ratio. As shown in FIG. 7(a), some plate-like test pieces were set in a sag-test jig so that each of them was 20 mm in projection length (in the drawing, the three set plate-like test pieces are shown in the drawing). When a bending moment and a section modulus were defined as "M" and "Z", respectively, the maximum stress "P", to which the plate-like test pieces held in a cantilever manner in a sag test, should be subjected, was calculated by the following equation:

$$P = M/Z = (W \times l^2/2)/(bh^2/6)$$
$$= [(g \times \rho \times l \times b \times h/l) \times l^2/2]/(bh^2/6)$$
$$= 3 \times g \times \rho \times l^2/h$$

Herein, M: Bending Stress (N·m)

Z: Section Modulus (m$^3$)

$Z = bh^2/6$ (in a rectangular configuration in section)

W: Uniformly-Distributed Load (N/m)

g: Gravity of Acceleration (m/s$^2$)

ρ: Density of Aluminum (kg/m$^3$)

l: Projection Length (m)

b: Width of Plate (m)

h: Thickness of Plate (m)

Note that the maximum stress "P" was exerted on a root of the projected portion of the plate-like test piece. The maximum stress was calculated by substituting respective values for the terms of the aforesaid equation, and the calculated result was 31 kPa. Such a maximum stress "P" is true for the below-mentioned EXAMPLES II, III and VI. The aforesaid plate-like test pieces were put in a nitrogen atmosphere, and then were heated to a given temperature (referred to as a bonding temperature in TABLE 2). After this condition was maintained over a time period of 180 seconds, the plate-like test pieces were naturally cooled in the furnace. The nitrogen atmosphere was controlled so that an oxygen density was not more than 100 ppm, and so that a dew point was not more than −45° C. An elevation rate of the temperature was 10° C./minute in a range of not less than 520° C.

After the heating process, a deformation ratio was found in each of the plate-like test pieces as below. First, as shown in FIG. 7(b), a quantity of sagging was measured in each of the plate-like test pieces after the heating process. Then, based on the projection length (20 mm), a deformation ratio (%) was calculated by the following equation:

[Quantity of Sagging (mm)/20 (mm)]×100

In estimation, a case where a deformation ratio was not more than 50% was estimated by symbol "⊚"; a case where a deformation ratio was more than 50% and not more than 70% was estimated by symbol "○"; a case where a deformation ratio was more than 70% and not more than 80% was estimated by symbol "Δ"; and a case where a deformation ratio was more than 80% was estimated by symbol "×".

(Comprehensive Judgment)

Based on the aforesaid test results, a comprehensive judgment was performed on each of the cases. In particular, when a case was estimated by symbol "⊚" in each of the two tests, 5 points was given to it; when a case was estimated by symbol "○" in each of the two tests, 3 points was given to it; when a case was estimated by symbol "Δ" in each of the two tests, a zero point was given to it; and when a case was estimated by symbol "×" in each of the two tests, −3 points was given to it. When a case gained 10 points in total, it was estimated by symbol "⊚"; when a case gained 6-9 points in total, it was estimated by symbol "○"; when a case gained 1-5 points in total, it was estimated by symbol "Δ"; and when a case gained a zero point or minus points in total, it was estimated by symbol "×". In the comprehensive judgment, the cases estimated by symbol "⊚", "○" or "Δ" were judged to be acceptable, and the cases estimated by symbol "×" were judged to be unacceptable. In TABLE 2, a bonding ratio, a deformation ratio and a result of a comprehensive judgment are shown together with corresponding bonding conditions (a bonding temperature, and a calculated value of an equilibrium liquid-phase ratio).

In each of Examples 1 to 26, since the liquid-phase ratio in the aluminum alloy material fell within the proper range, it was possible to obtain a superior bonding, and thus Examples 1 to 26 were acceptable in the comprehensive judgment.

In Comparative Example 27, due to the fact that the liquid-phase ratio was too small, the bonding ratio declined so that Example 27 was unacceptable in the comprehensive judgment.

In each of Comparative Examples 28 to 31 and 33, due to the fact that the liquid-phase ratio was too large, the deformation ratio became larger so that Comparative Examples 28 to 31 and 33 were unacceptable in the comprehensive judgment.

In Comparative Example 32, due to the fact that any liquid phases were not generated, the bonding could not be obtained so that Comparative Example 32 was unacceptable in the comprehensive judgment.

Example II

Examples 33 to 61 and Comparative Examples 62 to 68

In TABLE 3, respective compositions of Al—Si—Mg alloys (Alloy Nos. 8 to 12) and Al—Cu—Mg alloys (Alloy Nos. 13 and 14) used in bonding processes are shown. Each of the alloys (Alloy Nos. 8 to 14) features a Mg content within the range from 0.2 mass % to 2.0 mass % in one member to be bonded falling, as specified in claim 2. Also, in TABLE 3, upper limit values and lower limit values on one of the two inequalities specified in each of claims 4 and 6, and respective equilibrium liquid-phase ratios in temperatures falling within the range from 580° C. to 635° C. are shown. Note, the equilibrium liquid-phase ratios are values calculated based on "Thermo-Calc". After each of ingots of the alloys shown in TABLE 3 was prepared, it was rolled by a hot rolling process and a cold rolling process into a sheet having a thickness of 1 mm. Then, the rolled sheet was passed through a leveler, and was subjected to an annealing process over a time period of two hours at a temperature of 380° C., resulting in production of a rolled sheet sample. Using the rolled sheet sample, a bonding ratio and a deformation ratio were estimated.

TABLE 3

| Alloy Num-ber | Alloy Composition (mass %) | | | | | | | Equilibrium Liquid-Phase Ratio (Calculated Value) (%) | | | | | | | | |
|---|---|---|---|---|---|---|---|---|---|---|---|---|---|---|---|---|
| | Si | Fe | Cu | Mn | Mg | Zn | Ti | Al | | | 580° C. | 590° C. | 600° C. | 610° C. | 620° C. | 630° C. | 635° C. |
| | | | | | | | | | 660-39.5X | 660-15.7X | | | | | | | |
| 8 | 1.5 | 0.3 | 0.02 | 0.01 | 0.7 | 0.01 | 0.02 | Balance | 600.8 | 636.5 | 5.0 | 7.2 | 10.7 | 15.5 | 21.8 | 32.7 | 41.8 |
| 9 | 2 | 0.3 | 0.02 | 0.01 | 0.7 | 0.01 | 0.02 | Balance | 581.0 | 628.6 | 9.3 | 12.3 | 16.8 | 22.0 | 30.1 | 43.9 | 55.1 |
| 10 | 2.5 | 0.3 | 0.02 | 0.01 | 0.7 | 0.01 | 0.02 | Balance | 561.3 | 620.8 | 13.7 | 17.5 | 22.3 | 28.7 | 38.4 | 55.0 | 68.4 |
| 11 | 3 | 0.3 | 0.02 | 0.01 | 0.7 | 0.01 | 0.02 | Balance | 541.5 | 612.9 | 18.2 | 22.7 | 27.9 | 35.4 | 46.8 | 66.1 | 81.7 |
| 12 | 4 | 0.3 | 0.02 | 0.01 | 0.7 | 0.01 | 0.02 | Balance | 502.0 | 597.2 | 27.3 | 32.4 | 39.3 | 49.0 | 63.7 | 88.4 | 100.0 |
| | | | | | | | | | 660-15.6Y | 660-6.9Y | | | | | | | |
| 13 | 0.1 | 0.2 | 3.0 | 0.01 | 0.7 | 0.01 | 0.02 | Balance | 613.2 | 639.3 | 3.5 | 6.1 | 9.6 | 14.6 | 21.7 | 32.6 | |
| 14 | 0.1 | 0.2 | 6.0 | 0.01 | 0.7 | 0.01 | 0.02 | Balance | 566.4 | 618.6 | 15.9 | 21.3 | 27.1 | 34.3 | 45.1 | 63.3 | |

(1) Estimation of Bonding Ratio

Two plates having a width of 20 mm and a length of 50 mm were cut off from the aforesaid rolled sheet sample, and end faces of each of these plates were smoothed by a milling machine. Then, the two respective plates were defined as upper and lower plates composed of aluminum alloy materials, and were combined with each other so as to produce a reverse T-shaped bonding-test piece, as shown in FIG. 6. The upper and lower plates of each of the bonding-test pieces thus produced were composed of a corresponding one of the aluminum alloy materials featuring the respective compositions shown in TABLE 3. In TABLE 4, each of the Examples represents a combination of the upper and lower plates in each of the bonding-test pieces. In each of the bonding-test pieces, the aluminum alloy compositions of the upper and lower plates were the same, and the plates composed of the aluminum alloy plates featuring the same composition were bonded to each other. In each of the bonding-test pieces, the faces to be bonded were not coated with any flux.

TABLE 4

| | Bonding-Conditions | | | Test Results | | |
|---|---|---|---|---|---|---|
| | Alloy Number | Bonding Temperature (° C.) | Equilibrium Liquid-Phase Ratio (Calculated Value) (%) | Bonding Ratio | Deformation Ratio | Comprehensive Judgement |
| Example 34 | 8 | 580 | 5.0 | Δ | ◎ | Δ |
| Example 35 | 8 | 590 | 7.2 | Δ | ◎ | Δ |
| Example 36 | 8 | 600 | 10.7 | ◎ | ◎ | ◎ |
| Example 37 | 8 | 620 | 21.8 | ◎ | ○ | ○ |
| Example 38 | 8 | 630 | 32.7 | ◎ | Δ | Δ |
| Example 39 | 9 | 580 | 9.3 | ○ | ◎ | ○ |
| Example 40 | 9 | 590 | 12.3 | ◎ | ◎ | ◎ |
| Example 41 | 9 | 600 | 16.8 | ◎ | ◎ | ◎ |
| Example 42 | 9 | 610 | 22.0 | ◎ | ○ | ○ |
| Example 43 | 9 | 620 | 30.1 | ◎ | ○ | ○ |
| Example 44 | 10 | 580 | 13.7 | ○ | ◎ | ○ |
| Example 45 | 10 | 590 | 17.5 | ◎ | ◎ | ◎ |
| Example 46 | 10 | 600 | 22.3 | ◎ | ◎ | ◎ |
| Example 47 | 10 | 610 | 28.7 | ◎ | ○ | ○ |
| Example 48 | 11 | 580 | 18.2 | ◎ | ◎ | ◎ |
| Example 49 | 11 | 590 | 22.7 | ◎ | ◎ | ◎ |
| Example 50 | 11 | 600 | 27.9 | ◎ | ○ | ○ |
| Example 51 | 12 | 580 | 27.3 | ◎ | ○ | ○ |
| Example 52 | 12 | 590 | 32.4 | ◎ | ○ | ○ |
| Example 53 | 13 | 590 | 6.1 | ○ | ◎ | ○ |
| Example 54 | 13 | 600 | 9.6 | ◎ | ◎ | ◎ |
| Example 55 | 13 | 610 | 14.6 | ◎ | ◎ | ◎ |
| Example 56 | 13 | 620 | 21.7 | ◎ | ◎ | ◎ |
| Example 57 | 13 | 630 | 32.6 | ◎ | ◎ | ◎ |
| Example 58 | 14 | 580 | 15.9 | ◎ | ◎ | ◎ |
| Example 59 | 14 | 590 | 21.3 | ◎ | ◎ | ◎ |
| Example 60 | 14 | 600 | 27.1 | ◎ | ◎ | ◎ |
| Example 61 | 14 | 610 | 34.3 | ◎ | ○ | ○ |

TABLE 4-continued

| | | Bonding-Conditions | | Test Results | | |
|---|---|---|---|---|---|---|
| | Alloy Number | Bonding Temperature (° C.) | Equilibrium Liquid-Phase Ratio (Calculated Value) (%) | Bonding Ratio | Deformation Ratio | Comprehensive Judgement |
| Comparative Example 62 | 8 | 570 | 0.0 | X | ◎ | X |
| Comparative Example 63 | 9 | 630 | 43.9 | ◎ | X | X |
| Comparative Example 64 | 10 | 620 | 38.4 | ◎ | X | X |
| Comparative Example 65 | 11 | 610 | 35.4 | ◎ | X | X |
| Comparative Example 66 | 12 | 600 | 39.3 | ◎ | X | X |
| Comparative Example 67 | 13 | 580 | 3.5 | X | ◎ | X |
| Comparative Example 68 | 14 | 620 | 45.1 | ◎ | X | X |

Each of the aforesaid bonding-test pieces was put in a vacuum environment, and then was heated to a given temperature (referred to as a bonding temperature in TABLE 4). After this condition was maintained over a time period of 180 seconds, the bonding-test piece was naturally cooled in the furnace. The vacuum environment was controlled so that a pressure was maintained at $10^{-5}$ torr. An elevation rate of the temperature was 10° C./minute in a range of not less than 520° C.

Similar to the case of the aforesaid EXAMPLE I, after the heating/bonding process, a bonding ratio was calculated in each of the bonding-test pieces. Also, each of the calculated bonding ratios was estimated, using a standard similar to that of the aforesaid EXAMPLE I.

(2) Estimation of Deformation Ratio

Plates having a width of 10 mm and a length of 30 mm were cut off from the aforesaid rolled sheet sample, and were used as plate-like test pieces for measuring a deformation ratio. As shown in FIG. 7(a), some plate-like test pieces were set in a sag-test jig so that each of them was 20 mm in projection length. The aforesaid plate-like test pieces were put in a vacuum environment, and then were heated to a given temperature (referred to as a bonding temperature in TABLE 4). After this condition was maintained over a time period of 180 seconds, the plate-like test pieces were naturally cooled in the furnace. The vacuum environment was controlled so that a pressure was maintained at $10^{-5}$ torr. An elevation rate of the temperature was 10° C./minute in a range of not less than 520° C.

Similar to the case of the aforesaid EXAMPLE I, after the heating process, a deformation ratio was calculated in each of the plate-like test pieces. Also, each of the calculated deformation ratios was estimated, using a standard similar to that of the aforesaid EXAMPLE I. Further, similar to the case of the aforesaid EXAMPLE I, comprehensive judgments were performed. In TABLE 4, a bonding ratio, a deformation ratio and a result of a comprehensive judgment are shown together with corresponding bonding conditions (a bonding temperature, and a calculated value of an equilibrium liquid-phase ratio).

In each of Examples 34 to 61, since the liquid-phase ratio in the aluminum alloy material fell within the proper range, it was possible to obtain a superior bonding, and thus Examples 34 to 61 were acceptable in the comprehensive judgment.

In Comparative Example 62, due to the fact that any liquid phases were not generated, the bonding could not be obtained so that Comparative Example 62 were unacceptable in the comprehensive judgment.

In each of Comparative Examples 63 to 66 and 68, due to the fact that the liquid-phase ratio was too large, the deformation ratio became larger so that Comparative Examples 63 to 66 and 68 were unacceptable in the comprehensive judgment.

In Comparative Example 67, due to the fact that the liquid-phase ratio was too small, the bonding ratio declined so that Example 67 was unacceptable in the comprehensive judgment.

Example III

Examples 69 to 119 and Comparative Examples 120 to 150

In addition to a part of the alloys shown in TABLES 1 and 3, using the respective alloys composed of the compositions shown in TABLE 5, bonding testes were carried out. A part of the used alloys featured the Mg content of not more than 0.5 mass %, as specified in claim 1, and the other part of the used alloys featured the Mg content falling within the range from 0.2 mass % to 2.0 mass %, as specified in claim 2. After each of ingots of the alloys concerned was prepared, it was rolled by a hot rolling process and a cold rolling process into a sheet having a thickness of 1 mm. Then, the rolled sheet was passed through a leveler, and was subjected to an annealing process over a time period of two hours at a temperature of 380° C., resulting in production of a rolled sheet sample. Using the rolled sheet sample, a bonding ratio and a deformation ratio were estimated.

TABLE 5

| | | Alloy Composition (mass %) | | | | | | | |
|---|---|---|---|---|---|---|---|---|---|
| Alloy Number | Name of Alloy | Si | Fe | Cu | Mn | Mg | Zn | Ti | Al |
| 15 | 0.5Si | 0.5 | 0.2 | 0.02 | — | — | — | — | Balance |
| 16 | 1Si | 1.0 | 0.2 | 0.02 | — | — | — | — | Balance |

TABLE 5-continued

| Alloy Number | Name of Alloy | Alloy Composition (mass %) | | | | | | | |
|---|---|---|---|---|---|---|---|---|---|
| | | Si | Fe | Cu | Mn | Mg | Zn | Ti | Al |
| 17 | 6Si | 6.0 | 0.2 | 0.02 | 0.01 | 0.001 | 0.01 | — | Balance |
| 18 | 0.5Cu | 0.1 | 0.2 | 0.5 | 0.01 | 0.001 | 0.01 | — | Balance |
| 19 | 1Cu | 0.1 | 0.2 | 1 | 0.01 | 0.001 | 0.01 | — | Balance |
| 20 | 2Cu | 0.1 | 0.2 | 2 | 0.01 | 0.001 | 0.01 | — | Balance |
| 21 | 11Cu | 0.1 | 0.2 | 11.0 | 0.01 | 0.001 | 0.01 | — | Balance |
| 22 | 14Cu | 0.1 | 0.2 | 14.0 | 0.01 | 0.001 | 0.01 | — | Balance |
| 23 | 16Cu | 0.1 | 0.2 | 16.0 | 0.01 | 0.001 | 0.01 | — | Balance |
| 24 | 0.5Si—0.7Mg | 0.5 | 0.2 | 0.02 | — | 0.7 | — | — | Balance |
| 25 | 1S—0.7Mg | 1.0 | 0.2 | 0.02 | — | 0.7 | — | — | Balance |
| 26 | 6Si—0.7Mg | 6.0 | 0.2 | 0.02 | 0.01 | 0.7 | 0.01 | — | Balance |
| 27 | 2.5Si—0.3Mg | 2.5 | 0.2 | 0.02 | 0.01 | 0.3 | 0.01 | — | Balance |
| 28 | 2.5Si—1.4Mg | 2.5 | 0.2 | 0.02 | 0.01 | 1.4 | 0.01 | — | Balance |
| 29 | 2.5Si—1.8Mg | 2.5 | 0.2 | 0.02 | 0.01 | 1.8 | 0.01 | — | Balance |
| 30 | 2.5Si—2.2Mg | 2.5 | 0.2 | 0.02 | 0.01 | 2.2 | 0.01 | — | Balance |
| 31 | 0.5Cu—0.7Mg | 0.1 | 0.2 | 0.5 | 0.01 | 0.7 | 0.01 | — | Balance |
| 32 | 1Cu—0.7Mg | 0.1 | 0.2 | 1 | 0.01 | 0.7 | 0.01 | — | Balance |
| 33 | 2Cu—0.7Mg | 0.1 | 0.2 | 2 | 0.01 | 0.7 | 0.01 | — | Balance |
| 34 | 11Cu—0.7Mg | 0.1 | 0.2 | 11.0 | 0.01 | 0.7 | 0.01 | — | Balance |
| 35 | 14Cu—0.7Mg | 0.1 | 0.2 | 14.0 | 0.01 | 0.7 | 0.01 | — | Balance |
| 36 | 16Cu—0.7Mg | 0.1 | 0.2 | 16.0 | 0.01 | 0.7 | 0.01 | — | Balance |
| 37 | 6Cu—0.3Mg | 0.1 | 0.2 | 6.0 | 0.01 | 0.3 | 0.01 | — | Balance |
| 38 | 6Cu—1.4Mg | 0.1 | 0.2 | 6.0 | 0.01 | 1.4 | 0.01 | — | Balance |
| 39 | 6Cu—1.8Mg | 0.1 | 0.2 | 6.0 | 0.01 | 1.8 | 0.01 | — | Balance |
| 40 | 6Cu—2.2Mg | 0.1 | 0.2 | 6.0 | 0.01 | 2.2 | 0.01 | — | Balance |
| 41 | 2.5Mg | 0.1 | 0.2 | 0.02 | 0.01 | 2.5 | 0.01 | — | Balance |
| 42 | 5Mg | 0.1 | 0.2 | 0.02 | 0.01 | 5.0 | 0.01 | — | Balance |
| 43 | 3Si-Lean Fe | 3.0 | 0.01 | 0.02 | 0.01 | 0.001 | 0.01 | — | Balance |
| 44 | 10Zn | 0.1 | 0.2 | 0.02 | 0.01 | 0.001 | 10 | — | Balance |
| 45 | 20Zn | 0.1 | 0.2 | 0.02 | 0.01 | 0.001 | 20 | — | Balance |
| 46 | 5Si—4Cu | 5.0 | 0.2 | 4.0 | 0.01 | 0.001 | 0.01 | — | Balance |
| 47 | 2.5Si—1Mn | 2.5 | 0.2 | 0.02 | 1.0 | 0.001 | 0.01 | — | Balance |
| 48 | 2.5Si—0.3Cu | 2.5 | 0.2 | 0.3 | 0.01 | 0.001 | 0.01 | — | Balance |
| 49 | 2.5Si—0.8Fe | 2.5 | 0.8 | 0.02 | 0.01 | 0.001 | 0.01 | — | Balance |
| 50 | 2.5Si—0.8Zn | 2.5 | 0.2 | 0.02 | 0.01 | 0.001 | 0.8 | — | Balance |
| 51 | 2.5Si—0.2Ti | 2.5 | 0.2 | 0.02 | 0.01 | 0.001 | 0.01 | 0.2 | Balance |
| 52 | 6Cu—0.6Si | 0.6 | 0.2 | 6.0 | 0.01 | 0.001 | 0.01 | — | Balance |
| 53 | 6Cu—0.8Fe | 0.1 | 0.8 | 6.0 | 0.01 | 0.001 | 0.01 | — | Balance |
| 54 | 6Cu—0.8Zn | 0.1 | 0.2 | 6.0 | 0.01 | 0.001 | 0.8 | — | Balance |
| 55 | 6Cu—1Mn | 0.1 | 0.2 | 6.0 | 1.0 | 0.001 | 0.01 | — | Balance |
| 56 | 6Cu—0.2Ti | 0.1 | 0.2 | 6.0 | 0.01 | 0.001 | 0.01 | 0.2 | Balance |

(1) Estimation of Bonding Ratio

Two plates having a width of 20 mm and a length of 50 mm were cut off from the aforesaid rolled sheet sample, and end faces of each of these plates were smoothed by a milling machine. Then, the two respective plates were defined as upper and lower plates composed of aluminum alloy materials, and were combined with each other so as to produce a reverse T-shaped bonding-test piece, as shown in FIG. 6. The upper and lower plates of each of the bonding-test pieces thus produced were composed of a corresponding one of the aluminum alloy materials featuring the respective compositions shown in TABLE 5. In TABLES 6 to 8, each of the Examples- represents a combination of the upper and lower plates in each of the bonding-test pieces. In each of the bonding-test pieces, the aluminum alloy compositions of the upper and lower plates were the same, and the plates composed of the aluminum alloy featuring the same composition were bonded to each other. In a part of the bonding-test pieces, the faces to be bonded were coated with either a potassium-fluoride based non-corrosive flux or a cesium-fluoride based non-corrosive flux, and, in the remaining part of the bonding-test pieces, the faces to be bonded were not coated with any fluxes. In TABLES 6 to 8, it is indicated whether or not a flux has been used, and it is indicated which type of flux has been selected when using a flux. In particular, "F" indicates use of the potassium-fluoride based non-corrosive flux ($KAlF_4$); "Cs" indicates use of the cesium-fluoride based non-corrosive flux ($CsAlF_4$); and "-" indicates no use of flux.

TABLE 6

| | | | Bonding-Conditions | | | | | | | | | | Test Results | | |
|---|---|---|---|---|---|---|---|---|---|---|---|---|---|---|---|
| | Alloy Number | Name of Alloy | Bonding Temperature (°C.) | Equilibrium Liquid-Phase Ratio (Calculated Value) (%) | Time Period at Bonding Temperature (sec.) | Temperature at Liquid-Phase Ratio of 5% (°C.) | Time Period for Liquid-Phase Ratio of at Least 5% (sec.) | Solidus Temperature (°C.) | Liquidus Temperature (°C.) | Difference between Solidus Temperature and Liquidus Temperature (°C.) | Atmosphere | Flux | Bonding Ratio | Deformation Ratio | Comprehensive Judgement |
| Example 69 | 15 | 0.5Si | 645 | 15.9 | 180 | 634 | 252 | 628 | 657 | 29 | Nitrogen | F | △ | ○ | △ |
| Example 70 | 16 | 1Si | 630 | 13.4 | 180 | 617 | 265 | 605 | 654 | 49 | Nitrogen | F | ○ | ◎ | ○ |
| Example 71 | 18 | 0.5Cu | 650 | 18.0 | 180 | 642 | 232 | 636 | 658 | 22 | Nitrogen | F | △ | ○ | △ |
| Example 72 | 19 | 1Cu | 640 | 11.8 | 180 | 633 | 226 | 624 | 657 | 33 | Nitrogen | F | ○ | ◎ | ○ |
| Example 73 | 20 | 2Cu | 620 | 6.9 | 180 | 617 | 200 | 603 | 654 | 51 | Nitrogen | F | ○ | ◎ | ○ |
| Example 74 | 20 | 2Cu | 630 | 14.0 | 180 | 617 | 265 | 603 | 654 | 51 | Nitrogen | F | ◎ | △ | ◎ |
| Example 75 | 21 | 11Cu | 580 | 34.5 | 180 | 546 | 401 | 545 | 629 | 84 | Nitrogen | F | ◎ | △ | △ |
| Example 76 | 22 | 14Cu | 550 | 30.7 | 180 | 546 | 206 | 545 | 620 | 75 | Nitrogen | Cs | ◎ | ○ | △ |
| Example 77 | 24 | 0.5Si—0.7Mg | 630 | 10.0 | 180 | 626 | 206 | 615 | 653 | 38 | Vacuum | — | △ | ○ | △ |
| Example 78 | 25 | 1Si—0.7Mg | 620 | 13.6 | 180 | 608 | 258 | 592 | 651 | 59 | Vacuum | — | ○ | ◎ | ○ |
| Example 79 | 27 | 2.5Si—0.3Mg | 600 | 19.9 | 180 | 566 | 401 | 562 | 644 | 82 | Vacuum | — | ○ | ○ | ○ |
| Example 80 | 28 | 2.5Si—1.4Mg | 600 | 26.5 | 180 | 555 | 473 | 555 | 639 | 84 | Vacuum | — | ◎ | ○ | ○ |
| Example 81 | 29 | 2.5Si—1.8Mg | 590 | 23.2 | 180 | 558 | 388 | 555 | 637 | 82 | Vacuum | — | ○ | ◎ | ○ |
| Example 82 | 31 | 0.5Cu—0.7Mg | 640 | 15.3 | 180 | 635 | 213 | 627 | 654 | 27 | Vacuum | — | △ | △ | △ |
| Example 83 | 32 | 1Cu—0.7Mg | 630 | 10.6 | 180 | 626 | 206 | 614 | 653 | 39 | Vacuum | — | ○ | ○ | ○ |
| Example 84 | 33 | 2Cu—0.7Mg | 620 | 13.3 | 180 | 608 | 258 | 590 | 651 | 61 | Vacuum | — | ○ | ○ | ○ |
| Example 85 | 34 | 11Cu—0.7Mg | 560 | 27.8 | 180 | 532 | 362 | 527 | 626 | 99 | Vacuum | — | ◎ | ◎ | ○ |
| Example 86 | 35 | 14Cu—0.7Mg | 550 | 34.5 | 180 | 556 | 141 | 535 | 617 | 82 | Nitrogen | — | ○ | △ | △ |
| Example 87 | 37 | 6Cu—0.3Mg | 580 | 13.3 | 180 | 556 | 336 | 535 | 642 | 107 | Nitrogen | — | ◎ | ◎ | ○ |
| Example 88 | 38 | 6Cu—1.4Mg | 580 | 20.7 | 180 | 525 | 538 | 504 | 637 | 133 | Nitrogen | — | ◎ | ○ | ○ |
| Example 89 | 39 | 6Cu—1.8Mg | 580 | 22.9 | 180 | 513 | 616 | 504 | 635 | 131 | Nitrogen | F | ○ | ○ | ○ |
| Example 90 | 43 | 3Si-Lean Fe | 600 | 22.6 | 180 | 577 | 330 | 577 | 642 | 65 | Nitrogen | F | ◎ | ◎ | ◎ |
| Example 91 | 44 | 10Zn | 620 | 11.3 | 180 | 617 | 200 | 613 | 642 | 29 | Nitrogen | F | ○ | ○ | ○ |
| Example 92 | 45 | 20Zn | 590 | 17.3 | 180 | 580 | 245 | 574 | 624 | 50 | Nitrogen | F | ◎ | ◎ | ◎ |
| Example 93 | 46 | 5Si—4Cu | 550 | 13.6 | 180 | 541 | 239 | 531 | 617 | 86 | Nitrogen | F | ○ | ◎ | ○ |
| Example 94 | 47 | 2.5Si—1Mn | 600 | 15.0 | 180 | 576 | 336 | 576 | 644 | 68 | Nitrogen | F | ◎ | ◎ | ◎ |

TABLE 7

| | | | Bonding-Conditions | | | | | | | | | | Test Results | | |
|---|---|---|---|---|---|---|---|---|---|---|---|---|---|---|---|
| | Alloy Number | Name of Alloy | Bonding Temperature (° C.) | Equilibrium Liquid-Phase Ratio (Calculated Value) (%) | Time Period at Bonding Temperature (sec.) | Temperature at Liquid-Phase Ratio of 5% (° C.) | Time Period for Liquid-Phase Ratio of at Least 5% (sec.) | Solidus Temperature (° C.) | Liquidus Temperature (° C.) | Difference between Solidus Temperature and Liquidus Temperature (° C.) | Atmosphere | Flux | Bonding Ratio | Deformation Ratio | Comprehensive Judgement |
| Example 95 | 48 | 2.5Si—0.3Cu | 600 | 19.5 | 180 | 573 | 357 | 572 | 644 | 72 | Nitrogen | F | ◎ | ◎ | ◎ |
| Example 96 | 49 | 2.5Si—0.8Fe | 600 | 14.7 | 180 | 575 | 342 | 575 | 643 | 68 | Nitrogen | F | ◎ | ◎ | ◎ |
| Example 97 | 50 | 2.5Si—0.8Zn | 600 | 19.4 | 180 | 574 | 351 | 574 | 644 | 70 | Nitrogen | F | ◎ | ◎ | ◎ |
| Example 98 | 51 | 2.5Si—0.2Ti | 600 | 17.5 | 180 | 575 | 341 | 575 | 660 | 85 | Nitrogen | F | ◎ | ◎ | ◎ |
| Example 99 | 52 | 6Cu—0.6Si | 600 | 28.2 | 180 | 551 | 502 | 535 | 640 | 105 | Nitrogen | F | ◎ | ◎ | ◎ |
| Example 100 | 53 | 6Cu—0.8Fe | 600 | 21.5 | 180 | 580 | 307 | 561 | 641 | 80 | Nitrogen | F | ◎ | ◎ | ◎ |
| Example 101 | 54 | 6Cu—0.8Zn | 600 | 23.9 | 180 | 562 | 427 | 543 | 642 | 99 | Nitrogen | F | ◎ | ◎ | ◎ |
| Example 102 | 55 | 6Cu—1Mn | 600 | 21.8 | 180 | 569 | 382 | 550 | 642 | 92 | Nitrogen | F | ◎ | ○○○ | ○○○ |
| Example 103 | 56 | 6Cu—0.2Ti | 600 | 22.0 | 180 | 565 | 406 | 546 | 705 | 159 | Nitrogen | F | ◎ | ○○○ | ○○○ |
| Example 104 | 3 | 2.5Si | 600 | 18.0 | 180 | 577 | 330 | 577 | 645 | 68 | Argon | Cs | ○ | ○○○ | ○○○ |
| Example 105 | 7 | 6Cu | 570 | 7.5 | 180 | 564 | 219 | 546 | 643 | 97 | Nitrogen | — | ○ | ○ | ○ |
| Example 106 | 10 | 2.5Si—0.7Mg | 590 | 17.5 | 180 | 562 | 362 | 562 | 642 | 80 | Argon | — | ○ | ○ | ○ |
| Example 107 | 10 | 2.5Si—0.7Mg | 590 | 17.5 | 180 | 562 | 362 | 562 | 642 | 80 | Nitrogen | — | ○ | ○ | ○ |
| Example 108 | 10 | 2.5Si—0.7Mg | 610 | 28.7 | 180 | 562 | 492 | 562 | 642 | 80 | Nitrogen | — | ○ | ○ | ○ |
| Example 109 | 14 | 6Cu—0.7Mg | 560 | 9.2 | 180 | 551 | 239 | 529 | 640 | 111 | Nitrogen | — | ○ | ○ | ○ |
| Example 110 | 14 | 6Cu—0.7Mg | 580 | 15.9 | 180 | 551 | 369 | 529 | 640 | 111 | Nitrogen | — | ○ | ○ | ○ |
| Example 111 | 14 | 6Cu—0.7Mg | 600 | 27.1 | 180 | 551 | 499 | 529 | 640 | 111 | Nitrogen | — | △ | △ | △ |
| Example 112 | 27 | 2.5Si—0.3Mg | 600 | 19.9 | 180 | 566 | 401 | 562 | 644 | 82 | Nitrogen | F | ◎ | ◎ | ◎ |
| Example 113 | 27 | 2.5Si—0.3Mg | 600 | 19.9 | 180 | 566 | 401 | 562 | 644 | 82 | Nitrogen | Cs | ○ | ○ | ○ |
| Example 114 | 37 | 6Cu—0.3Mg | 580 | 13.3 | 180 | 556 | 336 | 535 | 642 | 107 | Nitrogen | F | ○ | ○ | ○ |
| Example 115 | 37 | 6Cu—0.3Mg | 580 | 13.3 | 180 | 556 | 336 | 535 | 642 | 107 | Nitrogen | Cs | △ | △ | △ |
| Example 116 | 3 | 2.5Si | 580 | 9.7 | 25 | 577 | 45 | 577 | 645 | 68 | Nitrogen | F | ◎ | ◎ | ◎ |
| Example 117 | 3 | 2.5Si | 610 | 23.6 | 660 | 577 | 875 | 577 | 645 | 68 | Nitrogen | F | ○ | ○ | ○ |
| Example 118 | 3 | 2.5Si | 610 | 23.6 | 1560 | 577 | 1775 | 577 | 645 | 68 | Nitrogen | F | ○ | ○ | ○ |
| Example 119 | 3 | 2.5Si | 610 | 23.6 | 3360 | 577 | 3575 | 577 | 645 | 68 | Nitrogen | F | △ | △ | △ |

TABLE 8

| | Alloy Number | Name of Alloy | Bonding-Conditions | | | | | | | | | Test Results | | |
|---|---|---|---|---|---|---|---|---|---|---|---|---|---|---|
| | | | Bonding Temperature (° C.) | Equilibrium Liquid-Phase Ratio (Calculated Value) (%) | Time Period at Bonding Temperature (sec.) | Temperature at Liquid-Phase Ratio of 5% (° C.) | Time Period for Liquid-Phase Ratio of at Least 5% (sec.) | Solidus Temperature (° C.) | Liquidus Temperature (° C.) | Difference between Solidus and Liquidus Temperature (° C.) | Atmosphere | Flux | Bonding Ratio | Deformation Ratio | Comprehensive Judgement |
| Comparative Example 120 | 15 | Al—0.5Si | 630 | 1.0 | 180 | 634 | 0 | 628 | 657 | 29 | Nitorogen | F | X | ◎ | X |
| Comparative Example 121 | 16 | Al—1.0Si | 610 | 1.6 | 180 | 617 | 0 | 605 | 654 | 49 | Nitorogen | F | X | ◎ | X |
| Comparative Example 122 | 17 | Al—6Si | 580 | 42.8 | 180 | 577 | 200 | 577 | 623 | 46 | Nitorogen | F | ◎ | X | X |
| Comparative Example 123 | 18 | Al—0.5Cu | 640 | 2.7 | 180 | 642 | 167 | 636 | 658 | 22 | Nitorogen | F | X | ◎ | X |
| Comparative Example 124 | 19 | 1Cu | 630 | 2.8 | 180 | 633 | 161 | 624 | 657 | 33 | Nitorogen | F | X | ◎ | X |
| Comparative Example 125 | 20 | 2Cu | 610 | 2.2 | 180 | 617 | 135 | 603 | 654 | 51 | Nitorogen | F | X | ◎ | X |
| Comparative Example 126 | 20 | 2Cu | 650 | 58.2 | 180 | 617 | 395 | 603 | 654 | 51 | Nitorogen | F | ◎ | X | X |
| Comparative Example 127 | 21 | 11Cu | 590 | 41.6 | 180 | 546 | 466 | 545 | 629 | 84 | Nitorogen | F | ◎ | X | X |
| Comparative Example 128 | 22 | 14Cu | 570 | 41.1 | 180 | 546 | 336 | 545 | 620 | 75 | Nitorogen | F | ◎ | X | X |
| Comparative Example 129 | 23 | 16Cu | 550 | 38.0 | 180 | 546 | 204 | 546 | 614 | 68 | Nitorogen | Cs | ◎ | X | X |
| Comparative Example 130 | 24 | 0.5Si—0.7Mg | 620 | 3.8 | 180 | 626 | 141 | 615 | 653 | 38 | Vacuum | — | X | ◎ | X |
| Comparative Example 131 | 25 | 1Si—0.7Mg | 600 | 4.6 | 180 | 608 | 128 | 592 | 651 | 59 | Vacuum | — | X | ◎ | X |
| Comparative Example 132 | 26 | 6Si—0.7Mg | 580 | 45.1 | 180 | 562 | 297 | 562 | 621 | 59 | Vacuum | — | ◎ | X | X |
| Comparative Example 133 | 30 | 2.5Si—2.2Mg | 590 | 25.2 | 180 | 568 | 323 | 555 | 636 | 81 | Vacuum | — | ◎ | ○ | X |
| Comparative Example 134 | 31 | 0.5Cu—0.7Mg | 630 | 3.4 | 180 | 635 | 0 | 627 | 654 | 27 | Vacuum | — | X | ◎ | X |
| Comparative Example 135 | 32 | 1Cu—0.7Mg | 620 | 3.7 | 180 | 626 | 0 | 614 | 653 | 39 | Vacuum | — | X | ◎ | X |
| Comparative Example 136 | 32 | 1Cu—0.7Mg | 650 | 63.3 | 180 | 626 | 336 | 614 | 653 | 39 | Vacuum | — | ○ | ○ | X |
| Comparative Example 137 | 33 | 2Cu—0.7Mg | 600 | 3.6 | 180 | 608 | 0 | 590 | 651 | 61 | Vacuum | — | X | ◎ | X |
| Comparative Example 138 | 33 | 2Cu—0.7Mg | 650 | 93.8 | 180 | 608 | 453 | 590 | 651 | 61 | Vacuum | — | — | X | X |
| Comparative Example 139 | 34 | 11Cu—0.7Mg | 580 | 38.8 | 180 | 532 | 492 | 527 | 626 | 99 | Vacuum | — | ◎ | X | X |
| Comparative Example 140 | 35 | 14Cu—0.7Mg | 560 | 39.1 | 180 | 556 | 206 | 535 | 617 | 82 | Vacuum | — | ◎ | X | X |
| Comparative Example 141 | 36 | 16Cu—0.7Mg | 550 | 41.6 | 180 | 531 | 304 | 524 | 610 | 86 | Vacuum | — | ◎ | X | X |
| Comparative Example 142 | 40 | 6Cu—2.2Mg | 560 | 17.8 | 180 | 512 | 492 | 510 | 633 | 123 | Nitorogen | — | X | ○ | X |
| Comparative Example 143 | 41 | 2.5Mg | 630 | 25.7 | 180 | 615 | 278 | 603 | 646 | 43 | Nitorogen | — | X | ○ | X |
| Comparative Example 144 | 42 | 5.0Mg | 600 | 20.3 | 180 | 577 | 330 | 572 | 634 | 62 | Nitorogen | — | X | ○ | X |
| Comparative Example 145 | 28 | 2.5Si—1.4Mg | 590 | 21.2 | 180 | 555 | 408 | 555 | 639 | 84 | Nitorogen | — | X | ○ | X |
| Comparative Example 146 | 38 | 6Cu—1.4Mg | 580 | 20.7 | 180 | 525 | 538 | 504 | 637 | 133 | Nitorogen | F | X | ○ | X |
| Comparative Example 147 | 38 | 6Cu—1.4Mg | 600 | 32.0 | 180 | 525 | 668 | 504 | 637 | 133 | Nitorogen | F | X | △ | X |
| Comparative Example 148 | 3 | 2.5Si | 600 | 18.0 | 180 | 577 | 330 | 577 | 645 | 68 | Vacuum | — | X | ◎ | X |
| Comparative Example 149 | 3 | 2.5Si | 580 | 9.7 | 5 | 577 | 25 | 577 | 645 | 68 | Nitorogen | F | X | ◎ | X |
| Comparative Example 150 | 3 | 2.5Si | 610 | 23.6 | 3800 | 577 | 4015 | 577 | 645 | 68 | Nitorogen | F | ◎ | X | X |

Each of the aforesaid bonding-test pieces was put in one of a nitrogen atmosphere, an argon atmosphere and a vacuum environment, and then was heated to a given temperature (referred to as a bonding temperature in TABLES 6 to 8). After this condition was maintained over a given time period referred to in TABLES 6 to 8, the bonding-test piece was naturally cooled in the furnace. The nitrogen or argon atmosphere was controlled so that an oxygen density was not more than 100 ppm, and so that a dew point was not more than −45° C. The vacuum environment was controlled so that a pressure was maintained at $10^{-5}$ torr. In either case, an elevation rate of the temperature was 10° C./minute in a range of not less than 520° C.

Similar to the case of the aforesaid EXAMPLE I, after the heating/bonding process, a bonding ratio was calculated in each of the bonding-test pieces. Also, each of the calculated bonding ratios was estimated, using a standard similar to that of the aforesaid EXAMPLE I.

(2) Estimation of Deformation Ratio

Plates having a width of 10 mm and a length of 30 mm were cut off from the aforesaid rolled sheet sample, and were used as plate-like test pieces for measuring a deformation ratio. As shown in FIG. 7(a), some plate-like test pieces were set in a sag-test jig so that each of them was 20 mm in projection length. As shown in TABLES 6 to 8, the aforesaid plate-like test pieces were put in one of a nitrogen atmosphere, an argon atmosphere and a vacuum environment, and then were heated to a given temperature (referred to as a bonding temperature in TABLES 6 to 8). After this condition was maintained over a given time period, the plate-like test pieces were naturally cooled in the furnace. The nitrogen or argon atmosphere was controlled so that an oxygen density was not more than 100 ppm, and so that a dew point was not more than −45° C. The vacuum environment was controlled so that a pressure was maintained at $10^{-5}$ torr. In either case, an elevation rate of the temperature was 10° C./minute in a range of not less than 520° C.

Similar to the case of the aforesaid EXAMPLE I, after the heating process, a deformation ratio was calculated in each of the plate-like test pieces. Also, each of the calculated deformation ratios was estimated, using a standard similar to that of the aforesaid EXAMPLE I. Further, similar to the case of the aforesaid EXAMPLE I, comprehensive judgments were performed. In TABLES 6 to 8, a bonding ratio, a deformation ratio and a result of a comprehensive judgment are shown together with corresponding bonding conditions (a bonding temperature, a calculated values of the equilibrium liquid-phase ratios, a time periods at a bonding temperature, a time period over which a liquid-phase ratio of at least 5% has been maintained, a solidus temperature, a liquidus temperature, and a difference between the solidus temperature and the liquidus temperature).

In each of Examples 69 to 119, since the liquid-phase ratio in the aluminum alloy material fell within the proper range, it was possible to obtain a superior bonding, and thus Examples 69 to 119 were acceptable in the comprehensive judgment.

In each of Comparative Examples 120, 121, 123 to 125, 130, 131, 134, 135 and 137, due to the fact that the liquid-phase ratio was too small, the bonding ratio declined so that Comparative Examples 120, 121, 123 to 125, 130, 131, 134, 135 and 137 were unacceptable in the comprehensive judgment.

In each of Comparative Examples 122, 126 to 129, 132, 136 and 138 to 141, due to the fact that the liquid-phase ratio was too large, the deformation ratio became larger so that Comparative Examples 122, 126 to 129, 132, 136 and 138 to 141 were unacceptable in the comprehensive judgment.

In each of Comparative Examples 133 and 142 to 144, due to the fact that the Mg content in the alloy was too large, the growth of Mg oxide was remarkably increased, and thus the bonding could not be obtained so that Comparative Examples 133 and 142 to 144 were unacceptable in the comprehensive judgment.

In each of Comparative Examples 145, 146 and 147, due to the fact that Mg in the aluminum alloy reacted with the flux, the effect of Mg was invalid was canceled so that the oxide film could not be demolished. Thus, the bonding could not be obtained so that Comparative Examples 145, 146 and 147 were unacceptable in the comprehensive judgment.

In Comparative Example 148, although the Al—Si alloy was used, the bonding-test piece was not coated with any fluxes so that the oxide film could not be demolished. Thus, the bonding could not be obtained so that Comparative Example 148 was unacceptable in the comprehensive judgment.

In Comparative Example 150, due to the fact that the time period, over which the liquid phase ratio of at least 5% was maintained, was too long, the deformation ratio became larger, and thus Comparative Example 150 was unacceptable in the comprehensive judgment.

Example IV

Examples 151 to 181 and Referential Examples 182 to 186

A sag test was carried out, and a stress P, which members to be bonded could not withstand, was estimated. In this estimation, the conditions (the kinds of alloys and the heating temperatures), under which the Examples were acceptable in the comprehensive judgment of EXAMPLE I, were selected, and only the deformation ratios thereof were further estimated in detail. For each of the plate-like test pieces, one of the aluminum alloys shown in TABLE 1 was selected and used. Each of the used plate-like test pieces featured a thickness of 1 mm, a width of 15 mm and a length of 60 mm. As shown in FIG. 7, some of the plate-like test pieces were set in a sag test jig, and projection lengths thereof varied within a range from 20 mm to 50 mm. In each of the plate-like test pieces, the maximum stress P was calculated based on the projection length thereof. The calculated results are shown in TABLE 9.

Concretely, the plate-like test pieces were put in a nitrogen atmosphere, and then were heated to a given temperature. After this condition was maintained over a time period of 180 seconds, the plate-like test pieces were naturally cooled in the furnace. The nitrogen atmosphere was controlled so that an oxygen density was not more than 100 ppm, and so that a dew point was not more than −45° C. An elevation rate of the temperature was 10° C./minute in a range of not less than 520° C.

After the heating process, a deformation ratio was found in each of the plate-like test pieces as below. First, as shown in FIG. 7(b), a quantity of sagging was measured in each of the plate-like test pieces after the heating process. Then, based on the projection length, a deformation ratio (%) was calculated by the following equation:

[Quantity of Sagging (mm)/Projection Length (mm)]× 100

In estimation, a case where a deformation ratio was less than 50% was estimated by symbol "⊙"; a case where a deformation ratio was at least 50% and less than 70% was estimated by symbol "○"; and a case where a deformation ratio was at least 70% was estimated by symbol "×". When each of the cases was estimated by symbol "⊙" or "○", it were judged to be acceptable. When each of the cases was estimated by symbol "×", it was judged to be unacceptable. In TABLE 9, a deformation ratio, a projection length, a stress and a critical stress are shown together with corresponding heating conditions (a heating temperature, a liquid-phase ratio, and a time period at the heating temperature). Also, in the TABLE 9, the estimation results are shown.

ditions (the kinds of alloys and the heating temperatures), under which the Examples were acceptable in the compre-

TABLE 9

| | Alloy Number | Name of Alloy | Heating Conditions | | | Test Results | | | |
|---|---|---|---|---|---|---|---|---|---|
| | | | Heating Temperature (° C.) | Equilibrium Liquid-Phase Ratio (Calculated Value) (%) | Time Period at Heating Temperature (sec.) | Projection Length (mm) | Stress P (kPa) | Critical Stress (kPa) | Deformation Ratio |
| Example 151 | 3 | 2.5Si | 580 | 9 | 180 | 20 | 31 | 352 | ⊚ |
| Example 152 | 3 | | 580 | 9 | 180 | 40 | 125 | 352 | ⊚ |
| Example 153 | 3 | | 580 | 9 | 180 | 60 | 280 | 352 | ○ |
| Example 154 | 3 | | 590 | 13 | 180 | 20 | 31 | 304 | ⊚ |
| Example 155 | 3 | | 590 | 13 | 180 | 40 | 125 | 304 | ○ |
| Example 156 | 3 | | 590 | 13 | 180 | 60 | 280 | 304 | Δ |
| Example 157 | 3 | | 600 | 17 | 180 | 20 | 31 | 256 | ⊚ |
| Example 158 | 3 | | 600 | 17 | 180 | 40 | 125 | 256 | ○ |
| Example 159 | 3 | | 600 | 17 | 180 | 50 | 190 | 256 | ○ |
| Example 160 | 3 | | 610 | 22 | 180 | 20 | 31 | 196 | ⊚ |
| Example 161 | 3 | | 610 | 22 | 180 | 40 | 125 | 196 | ○ |
| Example 162 | 3 | | 610 | 22 | 180 | 50 | 190 | 196 | Δ |
| Example 163 | 3 | | 620 | 30 | 180 | 20 | 31 | 100 | ⊚ |
| Example 164 | 7 | 6Cu | 560 | 5 | 180 | 20 | 31 | 400 | ⊚ |
| Example 165 | 7 | | 560 | 5 | 180 | 40 | 125 | 400 | ⊚ |
| Example 166 | 7 | | 560 | 5 | 180 | 60 | 280 | 400 | ○ |
| Example 167 | 7 | | 570 | 8 | 180 | 20 | 31 | 364 | ⊚ |
| Example 168 | 7 | | 570 | 8 | 180 | 40 | 125 | 364 | ⊚ |
| Example 169 | 7 | | 570 | 8 | 180 | 60 | 280 | 364 | ○ |
| Example 170 | 7 | | 580 | 11 | 180 | 20 | 31 | 328 | ⊚ |
| Example 171 | 7 | | 580 | 11 | 180 | 40 | 125 | 328 | ⊚ |
| Example 172 | 7 | | 580 | 11 | 180 | 60 | 280 | 328 | Δ |
| Example 173 | 7 | | 590 | 15 | 180 | 20 | 31 | 280 | ⊚ |
| Example 174 | 7 | | 590 | 15 | 180 | 40 | 125 | 280 | ○ |
| Example 175 | 7 | | 590 | 15 | 180 | 60 | 280 | 280 | Δ |
| Example 176 | 7 | | 600 | 19 | 180 | 20 | 31 | 232 | ⊚ |
| Example 177 | 7 | | 600 | 19 | 180 | 40 | 125 | 232 | ○ |
| Example 178 | 7 | | 600 | 19 | 180 | 50 | 190 | 232 | Δ |
| Example 179 | 7 | | 610 | 25 | 180 | 20 | 31 | 160 | ⊚ |
| Example 180 | 7 | | 610 | 25 | 180 | 40 | 125 | 160 | ○ |
| Example 181 | 7 | | 620 | 34 | 180 | 20 | 31 | 52 | ○ |
| Referential Example 182 | 3 | 2.5Si | 600 | 17 | 180 | 60 | 280 | 256 | X |
| Referential Example 183 | 3 | | 620 | 30 | 180 | 40 | 125 | 100 | X |
| Referential Example 184 | 7 | 6Cu | 600 | 19 | 180 | 60 | 280 | 232 | X |
| Referential Example 185 | 7 | | 610 | 25 | 180 | 50 | 190 | 160 | X |
| Referential Example 186 | 7 | | 620 | 34 | 180 | 30 | 70 | 52 | X |

In each of Examples 151 to 186, the stress "P" (kPa) was equal to or less than the critical stress (460-12V) when the liquid-phase ratio was "V" (%). As a result, in each of Examples 151 to 186, the quantity of sagging was less than 70% to the projection length of the plate-like test piece, and thus it was possible to obtain a superior deformation ratio.

On the other hand, in each of Referential Examples 182 to 186, the stress "P" was more than the critical stress (460-12V). As a result, in each of Referential Examples 182 to 186, the quantity of sagging was more than 70% to the projection length of the plate-like test piece, and thus a deformation ratio became larger.

According to the aforesaid test results, as long as a stress "P" exerted on a member to be bonded can be suppressed to be not more than 5% before and after a bonding process, it is possible to manufacture a high precise structure.

Example V

Examples 187 to 204 and Comparative Examples 205 to 213

A clearance test was carried out, and undulation of members to be bonded was estimated. In this estimation, the con-hensive judgment of EXAMPLE I, were selected, and only the bonding ratios thereof were further estimated in detail. For each of the plate-like test pieces, one of the aluminum alloys shown in TABLE 1 was selected and used. After each of ingots of the selected aluminum alloys was prepared, it was rolled by a hot rolling process and a cold rolling process into a sheet having a thickness of 3 mm. Then, the rolled sheet was passed through a leveler, and was subjected to an annealing process over a time period of two hours at a temperature of 380° C. Plates each having a size of 150 mm×100 mm were cut off from the rolled sheet, and each of the plates was processed by a milling machine so that one face of the plate was smoothed. Further, plates having a size of 30 mm×30 mm were cut off from each of the smoothed plates, resulting in production of test pieces.

In each of the test pieces, a surface roughness on the processed face was measured by using a confocal microscope to thereby draw an undulation curve, and an arithmetic average undulation (Wa1, Wa2) was calculated based on the undulation curve. In this case, a measurement direction was set so as to be perpendicular to scores left on the smoothed face of the test piece, and the measurement was carried out along five lines defined on the smoothed at regular intervals of 5 mm. Also, a cutoff wavelength was set so that the measured wavelengths could fall within the range from 25 μm to 2500 μm.

Then, two of the test pieces thus prepared were piled one on top of the other so that the smoothed faces thereof were in contact with each other, resulting in production of a test pile piece to be measured. Note, when the two test pieces were piled, they were oriented so that the scores left on the smoothed face of one of the test pieces were perpendicular to the scores left on the smoothed face of the other test piece. Also, note, in accordance with a kind of the used aluminum alloy and a heating temperature thereof, the smoothed faces to be bonded were coated with either $KAlF_4$ defined as the potassium-fluoride based non-corrosive flux or $CsAlF_4$ defined as the cesium-fluoride based non-corrosive flux, or the smoothed faces to be bonded were coated with no flux, while the test pieces were piled. Each of the test pile pieces to be measured was put in an nitrogen atmosphere, and then was heated to a given temperature (560° C., 580° C. or 600° C.). After this condition was maintained over a time period of 180 seconds, the test pile piece to be measured was naturally cooled in the furnace. The nitrogen atmosphere was controlled so that an oxygen density was not more than 100 ppm, and so that a dew point was not more than −45° C. An elevation rate of the temperature was 10° C./minute in a range of not less than 520° C.

With respect to each of the test pile pieces subjected to the heating/bonding process as mentioned above, using a ultrasonic flaw detector, a bonded area A was measured in the bonding junction of the test pile piece concerned. Then, a bonding ratio (%) was calculated by the following equation:

[Area A/Total Area In Bonding Junction]×100

In estimation, a case where a bonding ratio was at least 50% was estimated by symbol "⊚"; a case where a bonding ratio was at least 25% and less than 50% was estimated by symbol "○"; and a case where a bonding ratio was less than 25% was estimated by symbol "×". In TABLE 10, a bonding ratio and an arithmetic average undulation are shown together with corresponding heating conditions (a heating temperature, a liquid-phase ratio, an atmosphere and a flux). Also, in TABLE 10, the estimation results are shown. Note, in the column of "Flux" of TABLE 10, "F" indicates use of $KAlF_4$; "Cs" indicates use of $CsAlF_4$; and "-" indicates no use of flux.

TABLE 10

| | Alloy Number | Name of Alloy | Heating Conditions Heating Temperature (° C.) | Equilibrium Liquid-Phase Ratio (Calculated Value) (%) | Atmosphere | Flux | Test Results Arithmetic Average Undulation (μm) Wa1 | Wa2 | Wa1 + Wa2 | Bonding Ratio |
|---|---|---|---|---|---|---|---|---|---|---|
| Example 187 | 4 | 2.5Si | 580 | 9 | Nitrogen | F | 2.93 | 3.71 | 6.64 | ○ |
| Example 188 | 4 | | 580 | 9 | Nitrogen | F | 3.84 | 3.27 | 7.11 | ○ |
| Example 189 | 4 | | 580 | 9 | Nitrogen | F | 2.81 | 2.27 | 5.08 | ⊚ |
| Example 190 | 4 | | 600 | 17 | Nitrogen | F | 3.32 | 3.2 | 6.52 | ○ |
| Example 191 | 4 | | 600 | 17 | Nitrogen | F | 2.55 | 3.18 | 5.73 | ⊚ |
| Example 192 | 4 | | 600 | 17 | Nitrogen | F | 4.92 | 4.89 | 9.81 | ○ |
| Example 193 | 13 | 6Cu | 560 | 5 | Nitrogen | Cs | 3.11 | 2.85 | 5.96 | ○ |
| Example 194 | 13 | | 560 | 5 | Nitrogen | Cs | 2.97 | 3.35 | 6.32 | ○ |
| Example 195 | 13 | | 560 | 5 | Nitrogen | Cs | 3.1 | 3.34 | 6.44 | ⊚ |
| Example 196 | 13 | | 580 | 11 | Nitrogen | F | 3.15 | 3.49 | 6.64 | ○ |
| Example 197 | 13 | | 580 | 11 | Nitrogen | F | 2.11 | 1.85 | 3.96 | ⊚ |
| Example 198 | 13 | | 580 | 11 | Nitrogen | F | 2.37 | 2.88 | 5.25 | ⊚ |
| Example 199 | 13 | | 600 | 19 | Nitrogen | F | 3.83 | 3.69 | 7.52 | ○ |
| Example 200 | 13 | | 600 | 19 | Nitrogen | F | 4.35 | 5.12 | 9.47 | ○ |
| Example 201 | 13 | | 600 | 19 | Nitrogen | F | 2.95 | 2.77 | 5.72 | ⊚ |
| Example 202 | 21 | 2.5Si—0.5Mg | 600 | 21 | Nitrogen | — | 2.91 | 3.31 | 6.22 | ○ |
| Example 203 | 21 | | 600 | 21 | Nitrogen | — | 2.22 | 2.87 | 5.09 | ⊚ |
| Example 204 | 21 | | 600 | 21 | Nitrogen | — | 4.13 | 5.01 | 9.14 | ○ |
| Referential Example 205 | 4 | 2.5Si | 580 | 9 | Nitrogen | F | 6.41 | 6.66 | 13.07 | X |
| Referential Example 206 | 4 | | 600 | 17 | Nitrogen | F | 5.79 | 7.7 | 13.49 | X |
| Referential Example 207 | 4 | | 600 | 17 | Nitrogen | F | 4.85 | 5.71 | 10.56 | X |
| Referential Example 208 | 13 | 6Cu | 560 | 5 | Nitrogen | Cs | 6.67 | 6.07 | 12.74 | X |
| Referential Example 209 | 13 | | 560 | 5 | Nitrogen | Cs | 6.44 | 5.71 | 12.15 | X |
| Referential Example 210 | 13 | | 580 | 11 | Nitrogen | F | 5.24 | 5.35 | 10.59 | X |
| Referential Example 211 | 13 | | 600 | 19 | Nitrogen | F | 6.01 | 5.57 | 11.58 | X |
| Referential Example 212 | 21 | 2.5Si—0.5Mg | 600 | 21 | Nitrogen | — | 4.92 | 5.97 | 10.89 | X |
| Referential Example 213 | 21 | | 600 | 21 | Nitrogen | — | 6.14 | 5.66 | 11.80 | X |

In each of Examples 187 to 204, a sum of the arithmetic average undulations Wa1 and Wa2 were not more than 10 μm, it was possible to obtain a superior bonding.

By contrast, each of Referential Examples 205 to 213, due to the fact that a sum of the arithmetic average undulations Wa1 and Wa2 exceeded 10 μm, there were many non-bonded areas.

Example VI

Examples 214 to 230

Using one of two members to be bonded to each other, which was formed of one of the respective alloys composed of the compositions shown in TABLES 1, 3 and 5, and the other member to be bonded, which was formed of another of the aforesaid alloys, bonding testes were carried out. A part of the used alloys featured the Mg content of not more than 0.5 mass %, as specified in claim 1, and the other part of the used alloys featured the Mg content falling within the range from 0.2 mass % to 2.0 mass %, as specified in claim 2. After each of ingots of the alloys concerned was prepared, it was rolled by a hot rolling process and a cold rolling process into a sheet having a thickness of 1 mm. Then, the rolled sheet was passed through a leveler, and was subjected to an annealing process over a time period of two hours at a temperature of 380° C., resulting in production of a rolled sheet sample. Using two of the rolled sheet samples thus produced, a bonding ratio was estimated.

(1) Estimation of Bonding Ratio

Plates having a width of 20 mm and a length of 50 mm were cut off from the aforesaid rolled sheet samples, and end faces of each of the plates were smoothed by a milling machine. Then, two respective plates were defined as upper and lower plates composed of aluminum alloy materials, as shown in TABLE 11, and were combined with each other so as to produce a reverse T-shaped bonding-test piece, as shown in FIG. 6. Alloy compositions of the upper and lower plates were different from each other, and each of Examples 214 to 227 was directed to an aluminum alloy bonding process in which the aluminum alloy in the other member to be bonded was subjected to a melting process. Also, each of Examples 228 to 230, in which different alloys were combined with each other, was directed to a bonding process in which both the members to be bonded were subjected to a melting process. In a part of the bonding-test pieces, the faces to be bonded were coated with either a potassium-fluoride based non-corrosive flux or a cesium-fluoride based non-corrosive flux, and, in the remaining part of the bonding-test pieces, the faces to be bonded were not coated with any fluxes. In TABLE 11, it is indicated whether or not a flux has been used, and it is indicated which type of flux has been selected when using a flux. In particular, "F" indicates use of the potassium-fluoride based non-corrosive flux ($KAlF_4$); "Cs" indicates use of the cesium-fluoride based non-corrosive flux ($CsAlF_4$); and "-" indicates no use of flux.

TABLE 11

| | Part | Alloy Number | Name of Alloy | Bonding-Conditions | | | | | | | | Test Results |
|---|---|---|---|---|---|---|---|---|---|---|---|---|
| | | | | Bonding Temperature (° C.) | Equilibrium Liquid-Phase Ratio (Calculated Value) (%) | Time Period at Bonding Temperature (sec.) | Time Period for Liquid-Phase Ratio of 5% (° C.) | Time Period for Liquid-Phase Ratio of at Least 5% (sec.) | Solidus Temperature (° C.) | Liquidus Temperature (° C.) | Difference between Solidus Temperature and Liquidus Temperature (° C.) | Atmosphere | Flux | Bonding Ratio |
| Example 214 | Upper Plate | 3 | 2.5Si | 580 | 9.7 | 180 | 577 | 200 | 577 | 645 | 68 | Nitrogen | F | ○ |
| | Lower Plate | 15 | 0.5Si | | 0.0 | | 634 | 0 | 628 | 657 | 29 | | | |
| Example 215 | Upper Plate | 3 | 2.5Si | 600 | 18.0 | 180 | 577 | 330 | 577 | 645 | 68 | Nitrogen | F | ◎ |
| | Lower Plate | 15 | 0.5Si | | 0.0 | | 634 | 0 | 628 | 657 | 29 | | | |
| Example 216 | Upper Plate | 3 | 2.5Si | 620 | 32.0 | 660 | 577 | 940 | 577 | 645 | 68 | Nitrogen | F | ◎ |
| | Lower Plate | 15 | 0.5Si | | 0.0 | | 634 | 0 | 628 | 657 | 29 | | | |
| Example 217 | Upper Plate | 3 | 2.5Si | 600 | 18.0 | 180 | 577 | 330 | 577 | 645 | 68 | Nitrogen | F | ◎ |
| | Lower Plate | 15 | 0.5Si | | 0.0 | | 634 | 0 | 628 | 657 | 29 | | | |
| Example 218 | Upper Plate | 7 | 6Cu | 570 | 7.5 | 180 | 564 | 219 | 546 | 643 | 97 | Nitrogen | Cs | ○ |
| | Lower Plate | 15 | 0.5Si | | 0.0 | | 634 | 0 | 628 | 657 | 29 | | | |
| Example 219 | Upper Plate | 7 | 6Cu | 580 | 11.2 | 180 | 564 | 284 | 546 | 643 | 97 | Nitrogen | F | ◎ |
| | Lower Plate | 15 | 0.5Si | | 0.0 | | 634 | 0 | 628 | 657 | 29 | | | |
| Example 220 | Upper Plate | 7 | 6Cu | 600 | 22.4 | 180 | 564 | 414 | 546 | 643 | 97 | Nitrogen | F | ◎ |
| | Lower Plate | 15 | 0.5Si | | 0.0 | | 634 | 0 | 628 | 657 | 29 | | | |
| Example 221 | Upper Plate | 10 | 2.5Si—0.7Mg | 580 | 13.7 | 180 | 562 | 297 | 562 | 642 | 80 | Vacuum | — | ◎ |
| | Lower Plate | 15 | 0.5Si | | 0.0 | | 634 | 0 | 628 | 657 | 29 | | | |
| Example 222 | Upper Plate | 10 | 2.5Si—0.7Mg | 600 | 22.3 | 180 | 562 | 427 | 562 | 642 | 80 | Vacuum | — | ◎ |
| | Lower Plate | 15 | 0.5Si | | 0.0 | | 634 | 0 | 628 | 657 | 29 | | | |
| Example 223 | Upper Plate | 10 | 2.5Si—0.7Mg | 600 | 22.3 | 180 | 562 | 427 | 562 | 642 | 80 | Nitrogen | — | ◎ |
| | Lower Plate | 15 | 0.5Si | | 0.0 | | 634 | 0 | 628 | 657 | 29 | | | |
| Example 224 | Upper Plate | 14 | 6Cu—0.7Mg | 580 | 15.9 | 180 | 551 | 369 | 529 | 640 | 111 | Vacuum | — | ◎ |
| | Lower Plate | 15 | 0.5Si | | 0.0 | | 634 | 0 | 628 | 657 | 29 | | | |
| Example 225 | Upper Plate | 14 | 6Cu—0.7Mg | 580 | 15.9 | 180 | 551 | 369 | 529 | 640 | 111 | Nitrogen | — | ◎ |
| | Lower Plate | 15 | 0.5Si | | 0.0 | | 634 | 0 | 628 | 657 | 29 | | | |
| Example 226 | Upper Plate | 14 | 6Cu—0.7Mg | 600 | 27.1 | 180 | 551 | 499 | 529 | 640 | 111 | Vacuum | — | ◎ |
| | Lower Plate | 15 | 0.5Si | | 0.0 | | 634 | 0 | 628 | 657 | 29 | | | |
| Example 227 | Upper Plate | 45 | 20Zn | 590 | 17.3 | 180 | 580 | 245 | 574 | 624 | 50 | Nitrogen | F | ◎ |
| | Lower Plate | 15 | 0.5Si | | 0.0 | | 634 | 0 | 628 | 657 | 29 | | | |
| Example 228 | Upper Plate | 3 | 2.5Si | 600 | 18.0 | 180 | 577 | 330 | 577 | 645 | 68 | Nitrogen | F | ◎ |
| | Lower Plate | 7 | 6Cu | | 11.2 | | 564 | 284 | 546 | 643 | 97 | | | |
| Example 229 | Upper Plate | 10 | 2.5Si—0.7Mg | 600 | 22.3 | 180 | 562 | 427 | 562 | 642 | 80 | Vacuum | — | ◎ |
| | Lower Plate | 7 | 6Cu | | 11.2 | | 564 | 284 | 546 | 643 | 97 | | | |
| Example 230 | Upper Plate | 10 | 2.5Si—0.7Mg | 600 | 22.3 | 180 | 562 | 427 | 562 | 642 | 80 | Vacuum | — | ◎ |
| | Lower Plate | 14 | 6Cu—0.7Mg | | 27.1 | | 551 | 499 | 529 | 640 | 111 | | | |

Each of the aforesaid bonding-test pieces was put in either a nitrogen or a vacuum environment, and then was heated to a given temperature (referred to as a bonding temperature in TABLE 11). After this condition was maintained over a given time period referred to in TABLE 11, the bonding-test piece was naturally cooled in the furnace. The nitrogen atmosphere was controlled so that an oxygen density was not more than 100 ppm, and so that a dew point was not more than −45° C. The vacuum environment was controlled so that a pressure was maintained at $10^{-5}$ torr. In either case, an elevation rate of the temperature was 10° C./minute in a range of not less than 520° C.

Similar to the case of the aforesaid EXAMPLE I, after the heating/bonding process, a bonding ratio was calculated and estimated in each of the bonding-test pieces. In each of Examples 214 to 230, due to the fact that a liquid-phase ratios fell within a proper range, all the liquid-phase ratios estimated by symbol "⊚" or "○" were superior and acceptable.

INDUSTRIAL APPLICABILITY

According to the present invention, it is possible to attain a bonding method for aluminum alloy materials, features superior bondability and high reliability, in which deformation does not nearly take place.

EXPLANATION OF REFERENCES c . . . Si Density
c1 . . . Si Density
c2 . . . Si Density
T . . . Temperature
T1 . . . Temperature Exceeding Te
T2 . . . Temperature Being Further Higher Than T1
T3 . . . Temperature Exceeding T2
Te . . . Solidus temperature
Te2 . . . Solidus temperature

The invention claimed is:

1. A method of bleed bonding two members directly to each other without a filler material wherein one of said members to be bonded consists of an aluminum alloy material, and wherein the other member to be bonded consists of either an aluminum alloy material or a pure aluminum material, the method comprising the steps of:
providing the two members to be bonded such that neither contains more than 0.5 mass % Mg, and such that neither contains whiskers or granules of a reinforcing material selected from the group consisting of Al2O3, SiC, Si3N4, TiC, and AlN;
coating either a fluoride-based flux or a chloride-based flux between the two members to be bonded; and
subsequently carrying out a bleed bonding process in a non-oxidizing atmosphere at a temperature, at which a ratio of a mass of liquid phases generated in the aluminum alloy material defined as said one member to the total mass of the aluminum alloy material of said one member falls within a range from 5% to 35%, whereby a clearance between the two members is filled with the liquid phases generated in the aluminum alloy material defined as said one member or with liquid phases generated in both of the two members such that a bond junction formed between the two members involves the metal structures of the two members only.

2. A method of bleed bonding two members directly to each other without a filler material wherein one of said members to be bonded consists of an aluminum alloy material, and wherein the other member to be bonded consists of either an aluminum alloy material or a pure aluminum material, the method comprising the steps of:
providing the aluminum alloy material defined as said one member such that it contains Mg falling within a range from 0.2 mass % to 2.0 mass %, and such that it does not contain whiskers or granules of a reinforcing material selected from the group consisting of Al2O3, SiC, Si3N4, TiC, and AlN;
providing the material defined as said other member such that it does not contain more than 2.0 mass % Mg, and such that it does not contain whiskers or granules of a reinforcing material selected from the group consisting of Al2O3, SiC, Si3N4, TiC, and AlN;
engaging the two members together without any flux provided between the two members; and
carrying out a bleed bonding process in either a vacuum environment or a non-oxidizing atmosphere at a temperature, at which a ratio of a mass of liquid phases generated in the aluminum alloy material defined as said one member to the total mass of the aluminum alloy material of said one member falls within a range from 5% to 35%, whereby a clearance between the two members is filled with the liquid phases generated in the aluminum alloy material defined as said one member or with liquid phases generated in both of the two members such that a bond junction formed between the two members involves the metal structures of the two members only.

3. The method of bleed bonding the two members to each other as set forth in claim 1, wherein a time period over which the ratio of the mass of liquid phases generated in the aluminum alloy material defined as said one member to the total mass of the aluminum alloy material concerned is maintained to be at least 5%, falls within a range from 30 seconds to 3,600 seconds.

4. The method of bleed bonding the two members to each other as set forth in claim 3, wherein the aluminum alloy for the aluminum alloy material defined as said one member further contains Si falling within a range from 0.6 mass % to 3.5 mass %; and that, when an Si element content is defined as X (a dimensionless value indicating mass %), a temperature T (a value indicating ° C.) of said aluminum alloy is regulated by the following equations during the bleed bonding process:

$$660-39.5X \leq T \leq 660-15.7X, \text{ and } T \geq 577.$$

5. The method of bleed bonding the two members to each other as set forth in claim 4, wherein said aluminum alloy further contains one element or more than one elements selected from the group consisting of Cu falling within a range from 0.05 mass % to 0.5 mass %, Fe falling within a range from 0.05 mass % to 1.0 mass %, Zn falling within a range from 0.2 mass % to 1.0 mass %, Mn falling within a range from 0.1 mass % to 1.8 mass %, and Ti falling within a range from 0.01 mass % to 0.3 mass %.

6. The method of bleed bonding the two members to each other as set forth in claim 3, wherein the aluminum alloy for the aluminum alloy material defined as said one member further contains Cu falling within a range from 0.7 mass % to 15.0 mass %; and that, when an Cu element content is defined as Y (a dimensionless value indicating mass %), a temperature T (a value indicating ° C.) of said aluminum alloy is regulated by the following equations during the bleed bonding process:

$$660-15.6Y \leq T \leq 660-6.9Y \text{ and } T \geq 548.$$

7. The method of bleed bonding the two members to each other as set forth in claim 4, wherein said aluminum alloy further contains one element or more than one elements selected from the group consisting of Si falling within a range from 0.05 mass % to 0.8 mass %, Fe falling within a range from 0.05 mass % to 1.0 mass %, Zn falling within a range from 0.2 mass % to 1.0 mass %, Mn falling within a range from 0.1 mass % to 1.8 mass %, and Ti falling within a range from 0.01 mass % to 0.3 mass %.

8. The method of bleed bonding the two members to each other as set forth in claim 1, wherein said bleed bonding process is carried out so that the following equation is satisfied:

$$P \leq 460 - 12V$$

when a maximum stress produced in said one member in which the liquid phases are generated is defined as P (a value indicating kPa), and when the ratio of the mass of liquid phases generated in the aluminum alloy material defined as said one member to the total mass of the aluminum alloy material of said one member is defined as V (a dimensionless value indicating mass %).

9. The method of bleed bonding the two members to each other as set forth in claim 2, wherein said bleed bonding process is carried out so that the following equation is satisfied:

$$P \leq 460 - 12V$$

when a maximum stress, produced in said one member in which the liquid phases are generated, is defined as P (a value indicating kPa), and when the ratio of the mass of liquid phases generated in the aluminum alloy material defined as said one member to the total mass of the aluminum alloy material of said one member, is defined as V (a dimensionless value indicating mass %).

10. The method of bleed bonding the two members to each other as set forth in claim 3 wherein said bleed bonding process is carried out so that the following equation is satisfied:

$$P \leq 460 - 12V$$

when a maximum stress, produced in said one member in which the liquid phases are generated, is defined as P (a value indicating kPa), and when the ratio of the mass of liquid phases generated in the aluminum alloy material defined as said one member to the total mass of the aluminum alloy material of said one member, is defined as V (a dimensionless value indicating mass %).

11. The method of bleed bonding the two members to each other as set forth in claim 4, wherein said bleed bonding process is carried out so that the following equation is satisfied:

$$P \leq 460 - 12V$$

when a maximum stress, produced in said one member in which the liquid phases are generated, is defined as P (a value indicating kPa), and when the ratio of the mass of liquid phases generated in the aluminum alloy material defined as said one member to the total mass of the aluminum alloy material of said one member, is defined as V (a dimensionless value indicating mass %).

12. The method of bleed bonding the two members to each other as set forth in claim 5, wherein said bleed bonding process is carried out so that the following equation is satisfied:

$$P \leq 460 - 12V$$

when a maximum stress, produced in said one member in which the liquid phases are generated, is defined as P (a value indicating kPa), and when the ratio of the mass of liquid phases generated in the aluminum alloy material defined as said one member to the total mass of the aluminum alloy material of said one member, is defined as V (a dimensionless value indicating mass %).

13. The method of bleed bonding the two members to each other as set forth in claim 6, wherein said bleed bonding process is carried out so that the following equation is satisfied:

$$P \leq 460 - 12V$$

when a maximum stress, produced in said one member in which the liquid phases are generated, is defined as P (a value indicating kPa), and when the ratio of the mass of liquid phases generated in the aluminum alloy material defined as said one member to the total mass of the aluminum alloy material of said one member, is defined as V (a dimensionless value indicating mass %).

14. The method of bleed bonding the two members to each other as set forth in claim 7, wherein said bleed bonding process is carried out so that the following equation is satisfied:

$$P \leq 460 - 12V$$

when a maximum stress, produced in said one member in which the liquid phases are generated, is defined as P (a value indicating kPa), and when the ratio of the mass of liquid phases generated in the aluminum alloy material defined as said one member to the total mass of the aluminum alloy material of said one member, is defined as V (a dimensionless value indicating mass %).

15. The method of bleed bonding the two members to each other as set forth in claim 1, wherein a sum of arithmetic average undulations Wa1 and Wa2, which are calculated based on bumps and dents on bonding faces of said both members to be bonded before said bleed bonding process, is represented by the following equation:

$$Wa1 + Wa2 \leq 10 \ (\mu M).$$

16. The method of bleed bonding the two members to each other as set forth in claim 2, wherein a sum of arithmetic average undulations Wa1 and Wa2, which are calculated based on bumps and dents on bonding faces of said both members to be bonded before said bleed bonding process, is represented by the following equation:

$$Wa1 + Wa2 \leq 10 \ (\mu M).$$

17. The method of bleed bonding the two members to each other as set forth in claim 3, wherein a sum of arithmetic average undulations Wa1 and Wa2, which are calculated based on bumps and dents on bonding faces of said both members to be bonded before said bleed bonding process, is represented by the following equation:

$$Wa1 + Wa2 \leq 10 \ (\mu M).$$

18. The method of bleed bonding the two members to each other as set forth in claim 4, wherein a sum of arithmetic average undulations Wa1 and Wa2, which are calculated based on bumps and dents on bonding faces of said both members to be bonded before said bleed bonding process, is represented by the following equation:

$$Wa1 + Wa2 \leq 10 \ (\mu M).$$

19. The method of bleed bonding the two members to each other as set forth in claim 5, wherein a sum of arithmetic average undulations Wa1 and Wa2, which are calculated based on bumps and dents on bonding faces of said both members to be bonded before said bleed bonding process, is represented by the following equation:

$$Wa1 + Wa2 \leq 10 \ (\mu M).$$

20. The method of bleed bonding the two members to each other as set forth in claim 6, wherein a sum of arithmetic average undulations Wa1 and Wa2, which are calculated based on bumps and dents on bonding faces of said both members to be bonded before said bleed bonding process, is represented by the following equation:

$$Wa1 + Wa2 \leq 10 \ (\mu M).$$

21. The method of bleed bonding the two members to each other as set forth in claim 7, wherein a sum of arithmetic average undulations Wa1 and Wa2, which are calculated based on bumps and dents on bonding faces of said both members to be bonded before said bleed bonding process, is represented by the following equation:

$$Wa1+Wa2 \leq 10 \, (\mu M).$$

22. The method of bleed bonding the two members to each other as set forth in claim 8, wherein a sum of arithmetic average undulations Wa1 and Wa2, which are calculated based on bumps and dents on bonding faces of said both members to be bonded before said bleed bonding process, is represented by the following equation:

$$Wa1+Wa2 \leq 10 \, (\mu M).$$

23. The method of bleed bonding the two members to each other as set forth in claim 1, wherein a difference between a solidus temperature and a liquidus temperature in the aluminum alloy material defined as said one member is at least 10° C.

24. The method of bleed bonding the two members to each other as set forth in claim 2, wherein a difference between a solidus temperature and a liquidus temperature in the aluminum alloy material defined as said one member is at least 10° C.

25. The method of bleed bonding the two members to each other as set forth in claim 3, wherein a difference between a solidus temperature and a liquidus temperature in the aluminum alloy material defined as said one member is at least 10° C.

26. The method of bleed bonding the two members to each other as set forth in claim 4, wherein a difference between a solidus temperature and a liquidus temperature in the aluminum alloy material defined as said one member is at least 10° C.

27. The method of bleed bonding the two members to each other as set forth in claim 5, wherein a difference between a solidus temperature and a liquidus temperature in the aluminum alloy material defined as said one member is at least 10° C.

28. The method of bleed bonding the two members to each other as set forth in claim 6, wherein a difference between a solidus temperature and a liquidus temperature in the aluminum alloy material defined as said one member is at least 10° C.

29. The method of bleed bonding the two members to each other as set forth in claim 7, wherein a difference between a solidus temperature and a liquidus temperature in the aluminum alloy material defined as said one member is at least 10° C.

30. The method of bleed bonding the two members to each other as set forth in claim 8, wherein a difference between a solidus temperature and a liquidus temperature in the aluminum alloy material defined as said one member is at least 10° C.

31. The method of bleed bonding the two members to each other as set forth in claim 9, wherein a difference between a solidus temperature and a liquidus temperature in the aluminum alloy material defined as said one member is at least 10° C.

32. The method of bleed bonding the two members to each other as set forth in claim 2, wherein a time period over which the ratio of the mass of liquid phases generated in the aluminum alloy material defined as said one member to the total mass of the aluminum alloy material concerned is maintained to be at least 5%, falls within a range from 30 seconds to 3,600 seconds.

33. The method of bleed bonding the two members to each other as set forth in claim 32, wherein the aluminum alloy for the aluminum alloy material defined as said one member further contains Si falling within a range from 0.6 mass % to 3.5 mass %; and that, when an Si element content is defined as X (a dimensionless value indicating mass %), a temperature T (a value indicating ° C.) of said aluminum alloy is regulated by the following equations during the bleed bonding process:

$$660-39.5X \leq T \leq 660-15.7X, \text{ and } T \geq 577.$$

34. The method of bleed bonding the two members to each other as set forth in claim 33, wherein said aluminum alloy further contains one element or more than one elements selected from the group consisting of Cu falling within a range from 0.05 mass % to 0.5 mass %, Fe falling within a range from 0.05 mass % to 1.0 mass %, Zn falling within a range from 0.2 mass % to 1.0 mass %, Mn falling within a range from 0.1 mass % to 1.8 mass %, and Ti falling within a range from 0.01 mass % to 0.3 mass %.

35. The method of bleed bonding the two members to each other as set forth in claim 32, wherein the aluminum alloy for the aluminum alloy material defined as said one member further contains Cu falling within a range from 0.7 mass % to 15.0 mass %; and that, when an Cu element content is defined as Y (a dimensionless value indicating mass %), a temperature T (a value indicating ° C.) of said aluminum alloy is regulated by the following equations during the bleed bonding process:

$$660-15.6Y \leq T \, 660 \leq 6.9Y \text{ and } T \geq 548,$$

36. The method of bleed bonding the two members to each other as set forth in claim 33, wherein said aluminum alloy further contains one element or more than one elements selected from the group consisting of Si falling within a range from 0.05 mass % to 0.8 mass %, Fe falling within a range from 0.05 mass % to 1.0 mass %, Zn falling within a range from 0.2 mass % to 1.0 mass %, Mn falling within a range from 0.1 mass % to 1.8 mass %, and Ti falling within a range from 0.01 mass % to 0.3 mass %.

37. The method of bleed bonding the two members to each other as set forth in claim 32 wherein said bleed bonding process is carried out so that the following equation is satisfied:

$$P \leq 460-12V$$

when a maximum stress, produced in said one member in which the liquid phases are generated, is defined as P (a value indicating kPa), and when the ratio of the mass of liquid phases generated in the aluminum alloy material defined as said one member to the total mass of the aluminum alloy material of said one member, is defined as V (a dimensionless value indicating mass %).

38. The method of bleed bonding the two members to each other as set forth in claim 33, wherein said bleed bonding process is carried out so that the following equation is satisfied:

$$P \leq 460-12V$$

when a maximum stress, produced in said one member in which the liquid phases are generated, is defined as P (a value indicating kPa), and when the ratio of the mass of liquid phases generated in the aluminum alloy material defined as said one member to the total mass of the aluminum alloy material of said one member, is defined as V (a dimensionless value indicating mass %).

39. The method of bleed bonding the two members to each other as set forth in claim 34, wherein said bleed bonding process is carried out so that the following equation is satisfied:

$$P \leq 460-12V$$

when a maximum stress, produced in said one member in which the liquid phases are generated, is defined as P (a value indicating kPa), and when the ratio of the mass of liquid phases generated in the aluminum alloy material defined as said one member to the total mass of the aluminum alloy material of said one member, is defined as V (a dimensionless value indicating mass %).

40. The method of bleed bonding the two members to each other as set forth in claim 35, wherein said bleed bonding process is carried out so that the following equation is satisfied:

$$P \leq 460 - 12V$$

when a maximum stress, produced in said one member in which the liquid phases are generated, is defined as P (a value indicating kPa), and when the ratio of the mass of liquid phases generated in the aluminum alloy material defined as said one member to the total mass of the aluminum alloy material of said one member, is defined as V (a dimensionless value indicating mass %).

41. The method of bleed bonding the two members to each other as set forth in claim 36, wherein said bleed bonding process is carried out so that the following equation is satisfied:

$$P \leq 460 - 12V$$

when a maximum stress, produced in said one member in which the liquid phases are generated, is defined as P (a value indicating kPa), and when the ratio of the mass of liquid phases generated in the aluminum alloy material defined as said one member to the total mass of the aluminum alloy material of said one member, is defined as V (a dimensionless value indicating mass %).

42. The method of bleed bonding the two members to each other as set forth in claim 32, wherein a sum of arithmetic average undulations Wa1 and Wa2, which are calculated based on bumps and dents on bonding faces of said both members to be bonded before said bleed bonding process, is represented by the following equation:

$$Wa1 + Wa2 \leq 10 \ (\mu M).$$

43. The method of bleed bonding the two members to each other as set forth in claim 33, wherein a sum of arithmetic average undulations Wa1 and Wa2, which are calculated based on bumps and dents on bonding faces of said both members to be bonded before said bleed bonding process, is represented by the following equation:

$$Wa1 + Wa2 \leq 10 \ (\mu M).$$

44. The method of bleed bonding the two members to each other as set forth in claim 34, wherein a sum of arithmetic average undulations Wa1 and Wa2, which are calculated based on bumps and dents on bonding faces of said both members to be bonded before said bleed bonding process, is represented by the following equation:

$$Wa1 + Wa2 \leq 10 \ (\mu M).$$

45. The method of bleed bonding the two members to each other as set forth in claim 35, wherein a sum of arithmetic average undulations Wa1 and Wa2, which are calculated based on bumps and dents on bonding faces of said both members to be bonded before said bleed bonding process, is represented by the following equation:

$$Wa1 + Wa2 \leq 10 \ (\mu M).$$

46. The method of bleed bonding the two members to each other as set forth in claim 36, wherein a sum of arithmetic average undulations Wa1 and Wa2, which are calculated based on bumps and dents on bonding faces of said both members to be bonded before said bleed bonding process, is represented by the following equation:

$$Wa1 + Wa2 \leq 10 \ (\mu M).$$

47. The method of bleed bonding the two members to each other as set forth in claim 32, wherein a difference between a solidus temperature and a liquidus temperature in the aluminum alloy material defined as said one member is at least 10° C.

48. The method of bleed bonding the two members to each other as set forth in claim 33, wherein a difference between a solidus temperature and a liquidus temperature in the aluminum alloy material defined as said one member is at least 10° C.

49. The method of bleed bonding the two members to each other as set forth in claim 34, wherein a difference between a solidus temperature and a liquidus temperature in the aluminum alloy material defined as said one member is at least 10° C.

50. The method of bleed bonding the two members to each other as set forth in claim 35, wherein a difference between a solidus temperature and a liquidus temperature in the aluminum alloy material defined as said one member is at least 10° C.

51. The method of bleed bonding the two members to each other as set forth in claim 35, wherein a difference between a solidus temperature and a liquidus temperature in the aluminum alloy material defined as said one member is at least 10° C.

* * * * *